United States Patent
Ichinose

(10) Patent No.: US 7,201,423 B2
(45) Date of Patent: Apr. 10, 2007

(54) LATCH DEVICE FOR BIAXIAL HINGE TAILGATE

(75) Inventor: Mikio Ichinose, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/401,332

(22) Filed: Apr. 11, 2006

(65) Prior Publication Data

US 2006/0249971 A1 Nov. 9, 2006

Related U.S. Application Data

(62) Division of application No. 10/895,128, filed on Jul. 21, 2004.

(30) Foreign Application Priority Data

Aug. 14, 2003 (JP) ............................. 2003-293434
Aug. 14, 2003 (JP) ............................. 2003-293435

(51) Int. Cl.
*B60J 5/02* (2006.01)

(52) U.S. Cl. .......................... 296/51; 49/192

(58) Field of Classification Search ................. 296/51, 296/57.1, 50, 146.8, 146.11, 146.12; 49/192; 292/285, DIG. 29; 16/366, 371, 334, 308
See application file for complete search history.

(56) References Cited

U.S. PATENT DOCUMENTS

| 2,806,735 | A |   | 9/1957  | Smith |
| 3,387,406 | A |   | 6/1968  | Coker et al. |
| 3,454,299 | A |   | 7/1969  | Hewitt et al. |
| 3,592,504 | A |   | 7/1971  | Sandor |
| 4,076,301 | A |   | 2/1978  | Gergoe |
| 6,131,989 | A | * | 10/2000 | Montone et al. ......... 296/146.8 |

* cited by examiner

*Primary Examiner*—Stephen Gordon
(74) *Attorney, Agent, or Firm*—Sughrue Mion, PLLC

(57) ABSTRACT

A latch device includes a biaxial hinge, a horizontal hinge latch mechanism, a vertical hinge latch mechanism, a common latch mechanism, a swing actuation handle, and a flap actuation handle is provided on a tailgate for realizing selective movement about both a vertical axis and a horizontal axis. A first disengagement detection unit detects disengagement of the horizontal hinge latch mechanism and a second disengagement detection unit that detects disengagement of the vertical hinge latch mechanism. A tailgate release-latch unit disables the actuation of the flap actuation handle upon detection of the disengaged condition of the horizontal hinge latch mechanism by the first disengagement detection unit, and swing actuation handle upon detection of the disengaged condition of the vertical hinge latch mechanism by the second disengagement detection unit.

4 Claims, 33 Drawing Sheets

LATCH DEVICE FOR BIAXIAL HINGE TAILGATE

This is a divisional of application Ser. No. 10/895,128 filed Jul. 21, 2004. The entire disclosure(s) of the prior application(s), application Ser. No. 10/895,128 is considered part of the disclosure of the accompanying Divisional application and is hereby incorporated by reference.

BACKGROUND OF THE INVENTION

1) Field of the Invention

The present invention relates to a latch device of a biaxial hinge tailgate that can be selectively released to open about two axes having different axial directions, wherein, upon selection of one axis for tailgate release, the tailgate release about the other axis is disabled, the latch device of the biaxial hinge tailgate including hinge latch mechanisms which assume a disengaged condition if the tailgate is released about one axis and latched if the tailgate is released about the other axis.

2) Description of the Related Art

In conventional station wagon type vehicles, a biaxial hinge tailgate allows selection of the tailgate movement from a substantially vertical position to a position assumed upon release of the tailgate by movement about a horizontal shaft provided on the bottom of the tailgate (flap-type release) or about a vertical shaft provided either on the left side or on the right side of the tailgate (swing-type release).

This type of biaxial tailgate has on the bottom left corner a multi-axis hinge that joins the tailgate. The multi-axis hinge includes a horizontal shaft and a vertical shaft. The biaxial tailgate is also provided with a latch device that can realize the swing-type release or the flap-type release described above. The latch device includes, on the lower right portion of the tailgate, a horizontal hinge latch mechanism which can swing about the horizontal shaft of the multi-axis hinge and which engages with/disengages from the vehicle body. A vertical hinge latch mechanism which can swing about the vertical shaft of the multi-axis hinge and which engages with/disengages from the vehicle body is provided on the upper left portion of the tailgate. A common latch mechanism, which engages with/disengages from the vehicle body, is provided on the upper right portion of the tailgate. A flap actuation handle is provided centrally on the inside (or outside) of the tailgate for unlatching the common latch mechanism and the horizontal hinge latch mechanism. A swing actuation handle is provided externally (or interiorly) on the tailgate for unlatching the common latch mechanism and the horizontal hinge latch mechanism. The common latch mechanism and the vertical hinge latch mechanism are disengaged by actuating the flap actuation handle, and flap-type release of the tailgate is realized by the turning of the horizontal shaft of the multi-axis hinge and the horizontal hinge latch mechanism. Likewise, the common latch mechanism and the horizontal hinge latch mechanism are disengaged by actuating the swing actuation handle, and swing-type release of the tailgate is realized by the turning of the vertical shaft of the multi-axis hinge and the vertical hinge latch mechanism.

Disengagement of all three latch mechanisms, namely, the horizontal hinge latch mechanism, the vertical hinge latch mechanism, and the common latch mechanism, is prevented upon redundant actuation of the swing actuation handle and the flap actuation handle of the biaxial hinge tailgate latch device. The common latch mechanism of the latch device includes a latch that engages with a striker fixed on the vehicle body, and a ratchet that both maintains and releases the engagement of the latch. The latch device has two release levers (a flap release lever and a swing release lever) that carry out the actuation of the ratchet in order to disengage the latch of the common latch mechanism. The flap release lever is actuated by actuating the flap actuation handle, and the swing release lever is actuated by actuating the swing actuation handle. One side of both the levers is actuated by the ratchet while actuation is throttled on the other side due to the levers coming in contact with one another. The horizontal hinge latch mechanism is linked to the swing release lever, and disengages with the disengagement of the common latch mechanism due to the swing actuation handle. The vertical hinge latch mechanism is linked to the flap release lever, and disengages with the disengagement of the common latch mechanism due to the flap actuation handle.

In the biaxial hinge tailgate latch device that has the structure described above, the flap release lever, which is flap actuation handle-actuated, obstructs the path of the swing release lever while disengaging the common latch mechanism and the horizontal hinge latch mechanism. In other words, when the flap release lever is actuated, it obstructs the swing release lever, which is swing actuation handle-actuated, and disables the actuation of the swing actuation handle by preventing the actuation of the swing movement lever and the disengagement of the vertical hinge latch mechanism. Similarly, the swing release lever, which is swing actuation handle-actuated, obstructs the path of the flap release lever while disengaging the common latch mechanism and the vertical hinge latch mechanism. In other words, when the swing release lever is actuated, it obstructs the flap release lever, which is flap actuation handle-actuated, and disables the actuation of the flap actuation handle by preventing the actuation of the flap movement lever and the disengagement of the horizontal hinge latch mechanism.

In the biaxial hinge tailgate latch device that has the structure described above, when the tailgate is opened by actuating the swing actuation handle, the vertical hinge latch mechanism turns. In other words, when the vertical hinge latch mechanism provided on the tailgate and the striker provided on the vehicle body are engaged, the striker acts as the shaft that turns the vertical hinge latch mechanism. On the other hand, when the tailgate is opened by actuating the flap actuation handle, the horizontal latch mechanism turns. In other words, when the horizontal hinge latch mechanism provided on the tailgate and the striker provided on the vehicle body are engaged, the striker acts as the shaft that turns the horizontal latch mechanism. Conventional techniques have been disclosed in, for instance, Japanese Patent Laid-Open Publication No. S50-3533, the U.S. Pat. No. 3,454,299, the U.S. Pat. No. 3,592,504, and the U.S. Pat. No. 4,076,301.

However, in the conventional biaxial hinge tailgate latch device, upon redundant actuation of the swing actuation handle and the latch movement handle, the actuation that first disengages the common latch mechanism overrides the other. The movement of the flap release lever or the swing release lever, whichever releases the common latch mechanism, disables the movement of the other by obstructing its movement. Thus, in the conventional tailgate latch device, the common latch mechanism, which is always functional, has to have a complicated structure in order to disable either one of the handle actuations during both flap release and swing release. Further, the common latch mechanism bears the brunt of the load since the provision of structure that causes obstruction concerns the common latch mechanism.

Further, in the conventional biaxial hinge tailgate latch device, if both the swing actuation handle and the flap actuation handle are simultaneously actuated, neither of the handle actuations can be disabled until the common latch mechanism is disengaged. Consequently, which handle actuation was in force cannot be determined until the tailgate actually moves.

Again, in the conventional biaxial hinge tailgate latch device, separate swing actuation handle and flap actuation handle are provided on the tailgate externally and interiorly. This increases the chance of different persons redundantly actuating the swing actuation handle and the flap actuation handle, leading to frequent occurrence of the above-described problem.

In the conventional biaxial hinge tailgate latch device, the vertical hinge latch mechanism and the horizontal hinge latch mechanism engage with the striker by means of the latch. When the hinge latch mechanism turns, the latch can be made to slide rotate with respect to the fixed striker. This however will result in the wearing away of the resin material on the latch provided in order to prevent noise due to contact with the striker.

Alternatively, the hinge latch mechanism may be turned by supporting the striker to make it rotatable with respect to the vehicle body by means of bearings, etc. However, the bearings are not durable enough to be able to withstand an anticipated load of 300 kg to 400 kg.

SUMMARY OF THE INVENTION

It is an object of the present invention to solve at least the problems in the conventional technology.

A biaxial hinge tailgate latch device according to an aspect of the present invention includes a biaxial hinge supporting rotatably about a first axis and a second axis, a tailgate against a fixed part; a first hinge latch mechanism that supports the tailgate rotatably about the first axis between an engaged condition and, by an actuation of a first actuation unit, a disengaged condition against the fixed part; a second hinge latch mechanism that supports the tailgate rotatably about the second axis between the engaged condition and, by the actuation of a second actuation unit, the disengaged condition against the fixed part; a first disengagement detection unit that detects the disengaged condition of the first hinge latch mechanism; a second disengagement detection unit that detects the disengaged condition of the second hinge latch mechanism; and a tailgate release-latch unit that disables the actuation of the second actuation unit when the first disengagement detection unit detects the first hinge latch mechanism to be in the disengaged condition and the actuation of the first actuation unit when the second disengagement detection unit detects the second hinge latch mechanism to be in the disengaged condition.

A biaxial hinge tailgate latch device according to another aspect of the present invention includes a biaxial hinge supporting rotatably about a first axis and a second axis, a tailgate against a fixed part; a first hinge latch mechanism that supports the tailgate rotatably about the first axis between an engaged condition and a disengaged condition against the fixed part; a second hinge latch mechanism that supports the tailgate rotatably about the second axis between the engaged condition and the disengaged condition against the fixed part, wherein the tailgate is pivoted about the second axis by setting the first hinge latch mechanism in the disengaged condition and about the first axis by setting the second hinge latch mechanism in the disengaged condition; and a first engaging bar that is provided on the fixed part for engaging with the first hinge latch unit and a second engaging bar that is provided on the fixed part for engaging with the second hinge latch unit, wherein the first engaging bar and the second engaging bar each rotatably supported against the fixed part with the aid of a pair of sliding shaft-bearing members.

The other objects, features, and advantages of the present invention are specifically set forth in or will become apparent from the following detailed description of the invention when read in conjunction with the accompanying drawings.

DETAILED DESCRIPTION

Exemplary embodiments of a latch device according to the present invention are explained below while referring to accompanying drawings.

Figure 1:
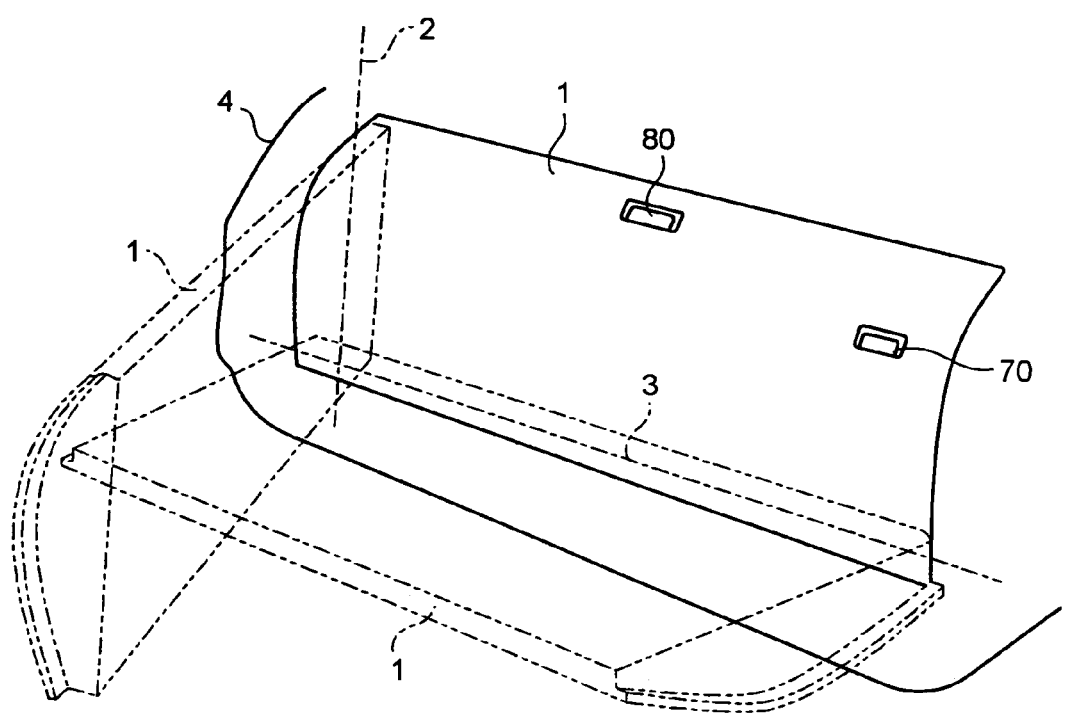
FIG. 1 is a drawing illustrating an oblique perspective view of a biaxial hinge tailgate in which a latch device according to an embodiment of the present invention is used.
Figure 2:
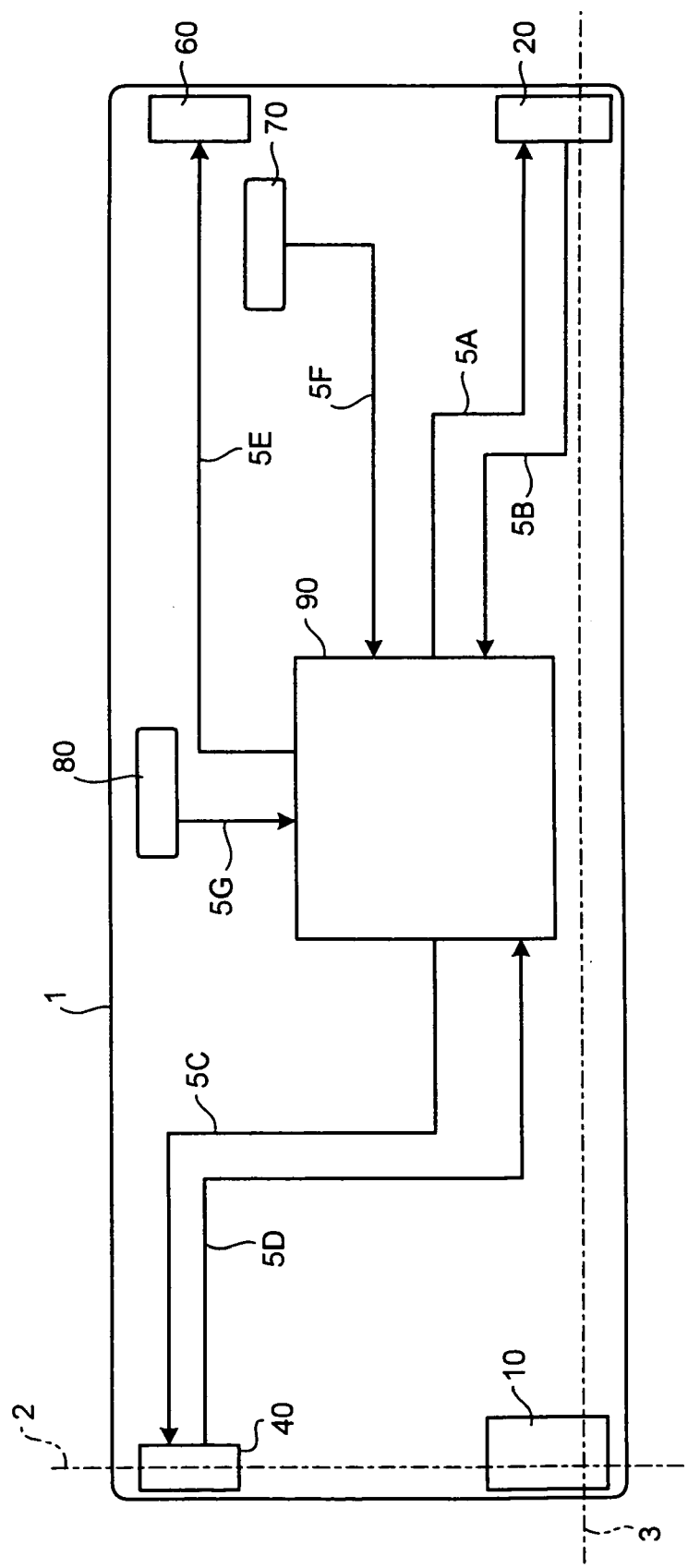
FIG. 2 is a schematic diagram of a biaxial hinge tailgate latch device according to an embodiment of the present invention.

FIG. 1 is a drawing illustrating an oblique perspective view of a biaxial hinge tailgate in which a latch device according to an embodiment the present invention is used. FIG. 2 is a schematic diagram of a biaxial hinge tailgate latch device according to an embodiment the present invention.

As shown in FIG. 1, the biaxial hinge tailgate 1 (hereinafter "tailgate") is used as a tailgate of a station wagon type vehicle. The tailgate 1 closes, for instance, a rear opening of a rear compartment of the vehicle, and is released to open for passengers or goods. The tailgate 1 has two selective modes of release from its substantially vertical position covering the rear opening. The two selectable modes of release are shown in FIG. 1 by phantom outlines, and are about a vertical axis 2 (swing-type release) provided on either the left or the right (in this embodiment, it is provided on the left) of the tailgate 1, and about a horizontal axis 3 (flap-type release) provided on the bottom of the tailgate 1. In other words, using the flap-type release of the tailgate 1 facilitates passengers to get on or off the vehicle, and using the swing-type release facilitates loading and unloading of goods.

The latch device according to the present invention selects either the swing-type release or the flap-type release of the tailgate 1. As shown in FIG. 2, the latch device includes a biaxial hinge 10, a horizontal hinge latch mechanism (a first hinge latch mechanism) 20, a vertical hinge latch mechanism (a second hinge latch mechanism) 40, a common latch mechanism 60, a swing actuation handle (a first actuation unit) 70, and a flap actuation handle (a second actuation unit) 80. The latch device also includes a tailgate release-latch unit 90 which connects the horizontal hinge latch mechanism 20, the vertical hinge latch mechanism 40, the common latch mechanism 60, the swing actuation handle 70, and the flap actuation handle 80.

Figure 3:
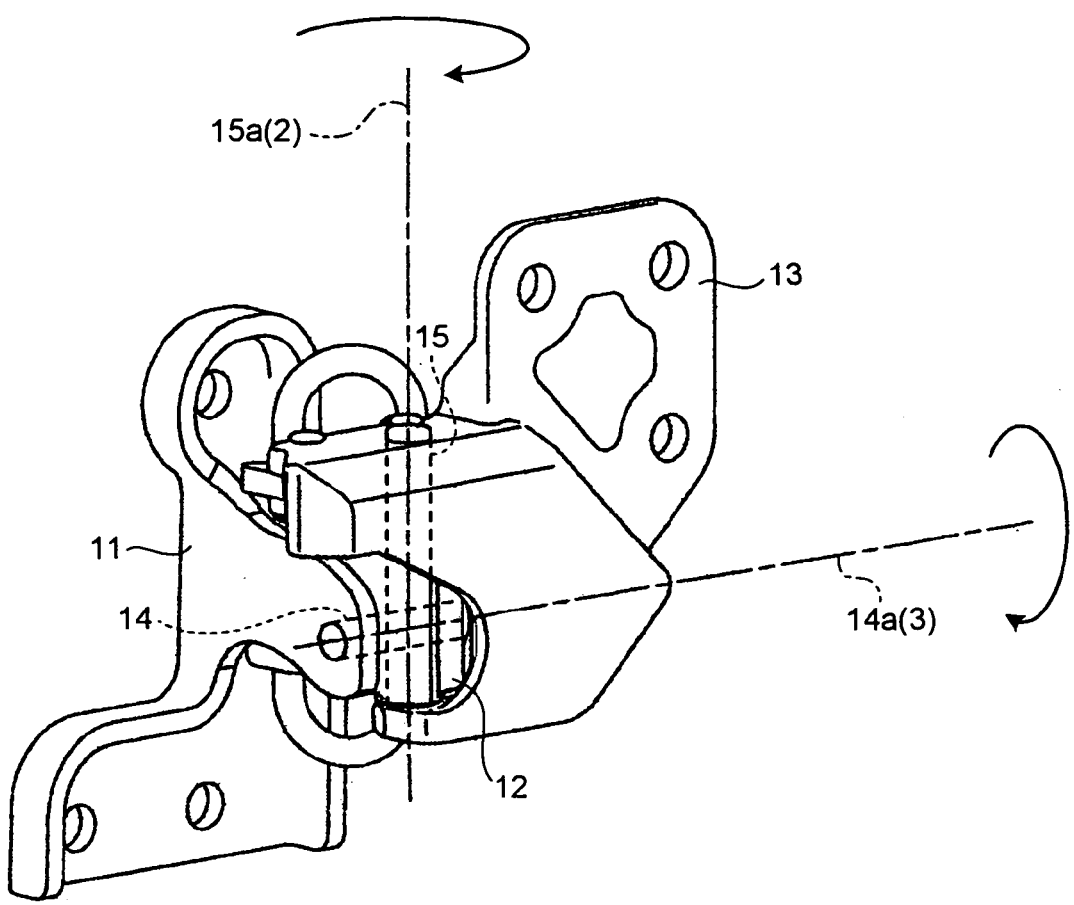
FIG. 3 is a drawing illustrating an oblique perspective view of a biaxial hinge.
Figure 4:
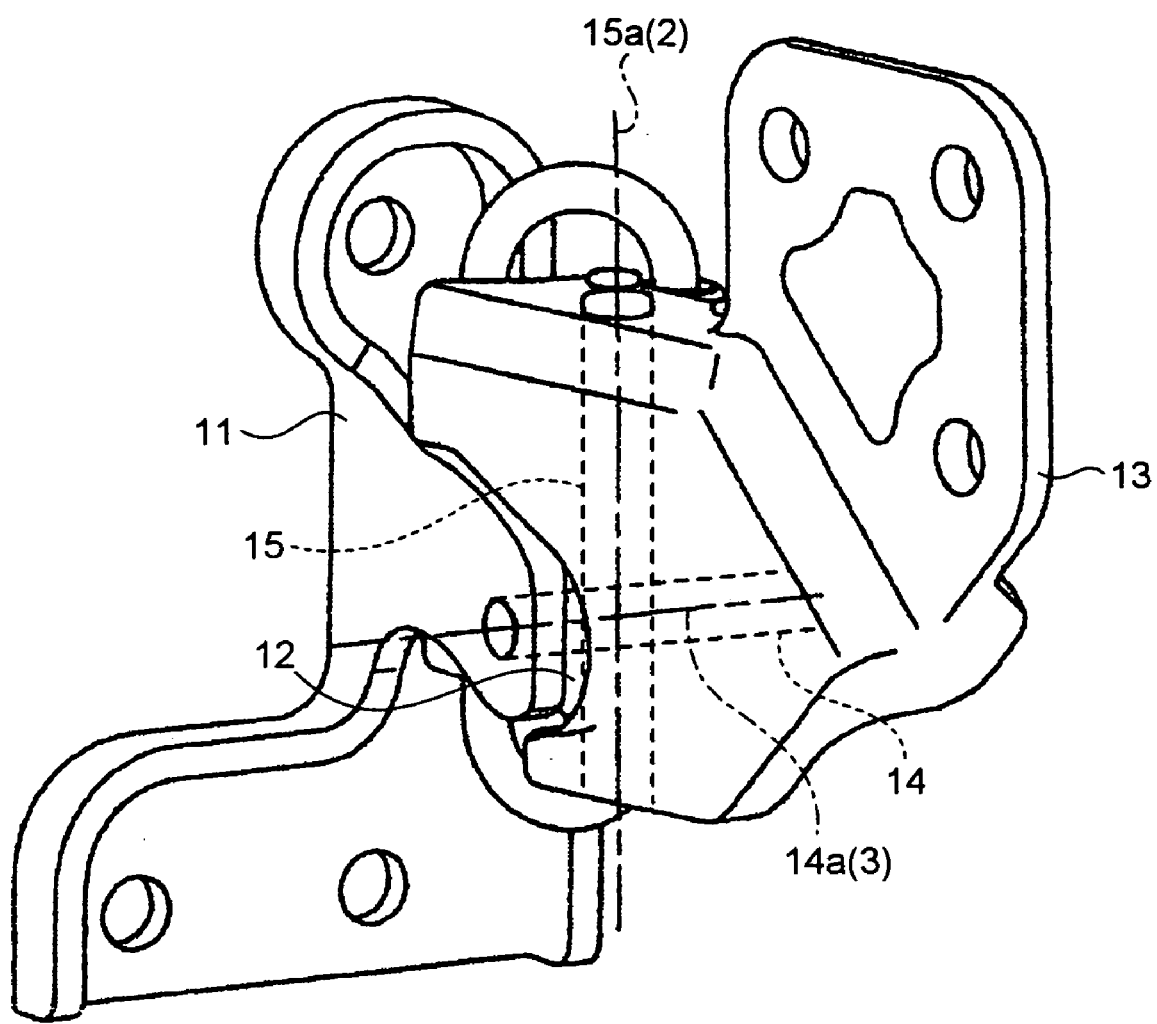
FIG. 4 is a drawing illustrating an oblique perspective view of the biaxial hinge in a swing release mode.
Figure 5:
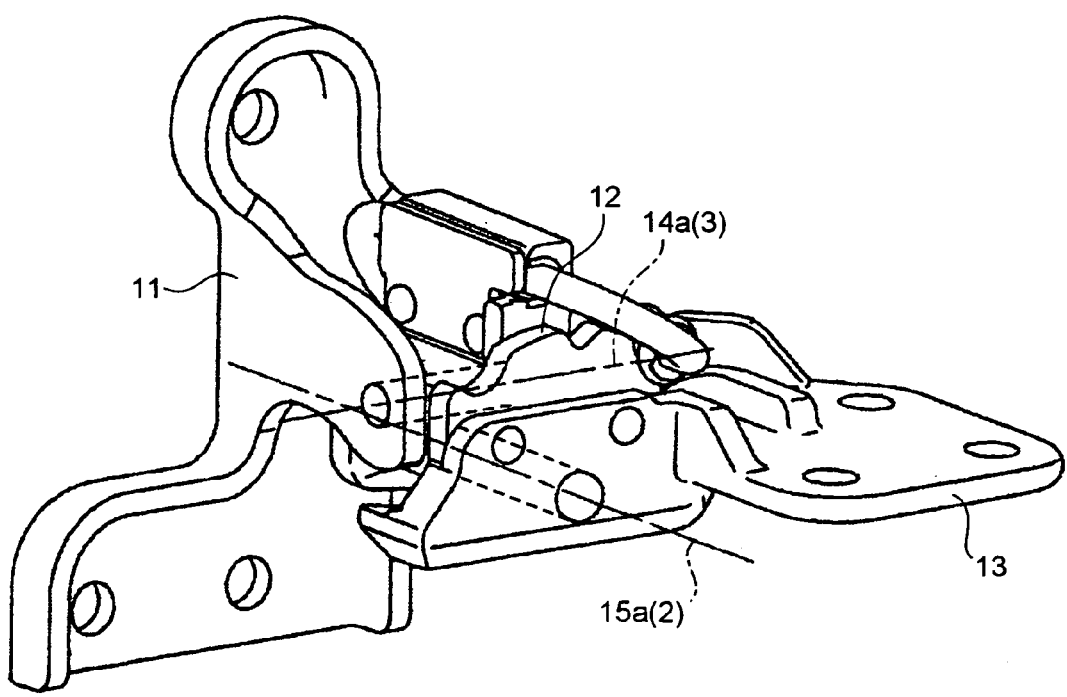
FIG. 5 is a drawing illustrating an oblique perspective view of the biaxial hinge in a flap release mode.

The biaxial hinge 10 is explained first. FIG. 3 is a drawing illustrating an oblique perspective view of the biaxial hinge. FIG. 4 is a drawing illustrating an oblique perspective view of the biaxial hinge in a swing release mode. FIG. 5 is a drawing illustrating an oblique perspective view of the biaxial hinge in a flap release mode.

The biaxial hinge 10 includes a rigid member 11, an intermediate member 12, and a movable member 13. The rigid member 11 is secured on a vertical face on the rear of the vehicle body 4 (see FIG. 1). The intermediate member 12 is pivotally supported with respect to the rigid member 11 by means of a horizontal shaft 14. The intermediate member 12 pivotally supports a vertical shaft 15 with the aid of the movable member 13.

As shown in FIG. 4, the biaxial hinge 10 supports, with the aid of the intermediate member 12 and with the rigid member 11 (fixed to the vehicle body 4) as the base, the movable member 13 (provided on the tailgate 1) pivotally about the vertical shaft 15. As shown in FIG. 5, the biaxial hinge 10 supports, with the aid of the intermediate member 12 and with the rigid member 11 (fixed to the vehicle body 4) as the base, the movable member pivotally about the horizontal shaft 14 as well as pivotally supports the movable member 13 (provided on the tailgate 1 side). An axial line 14a of the horizontal shaft 14 and the horizontal axis 3 are on the same axial line. Similarly, the axial line 15a of the vertical shaft 15 and the vertical axis 2 are on the same axial line. Therefore, the biaxial hinge 10, as shown in FIG. 2, is provided on the lower left corner of the tailgate 1 where the vertical axis 2 and the horizontal axis 3 intersect. As a result, the biaxial hinge 10 pivotally supports the tailgate 1 against the vehicle body 4 about the two shafts 14 and 15 having different axial directions.

Figure 6:
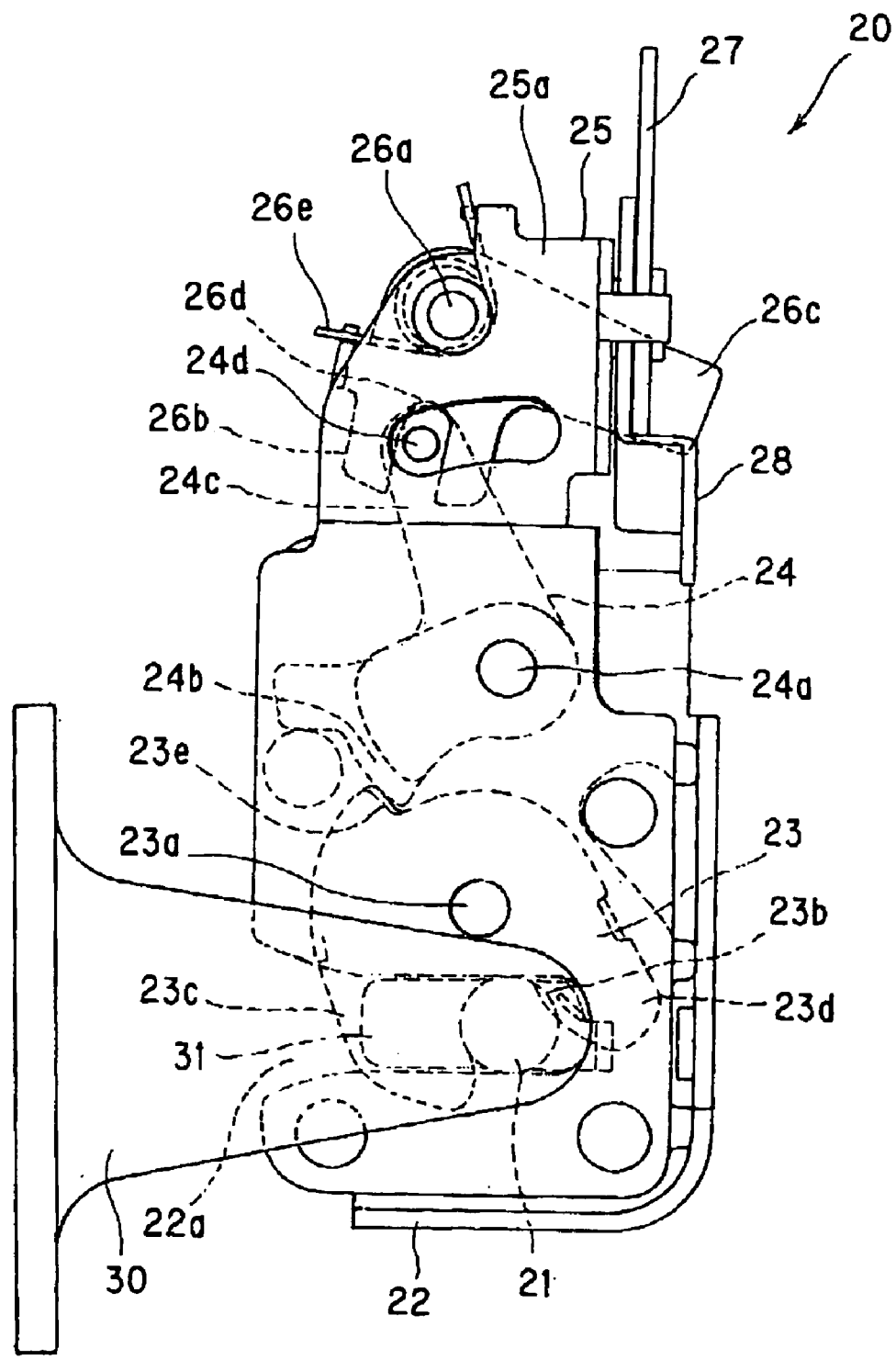
FIG. 6 is a drawing illustrating a left-hand side view of a horizontal hinge latch mechanism in an engaged condition.
Figure 7:
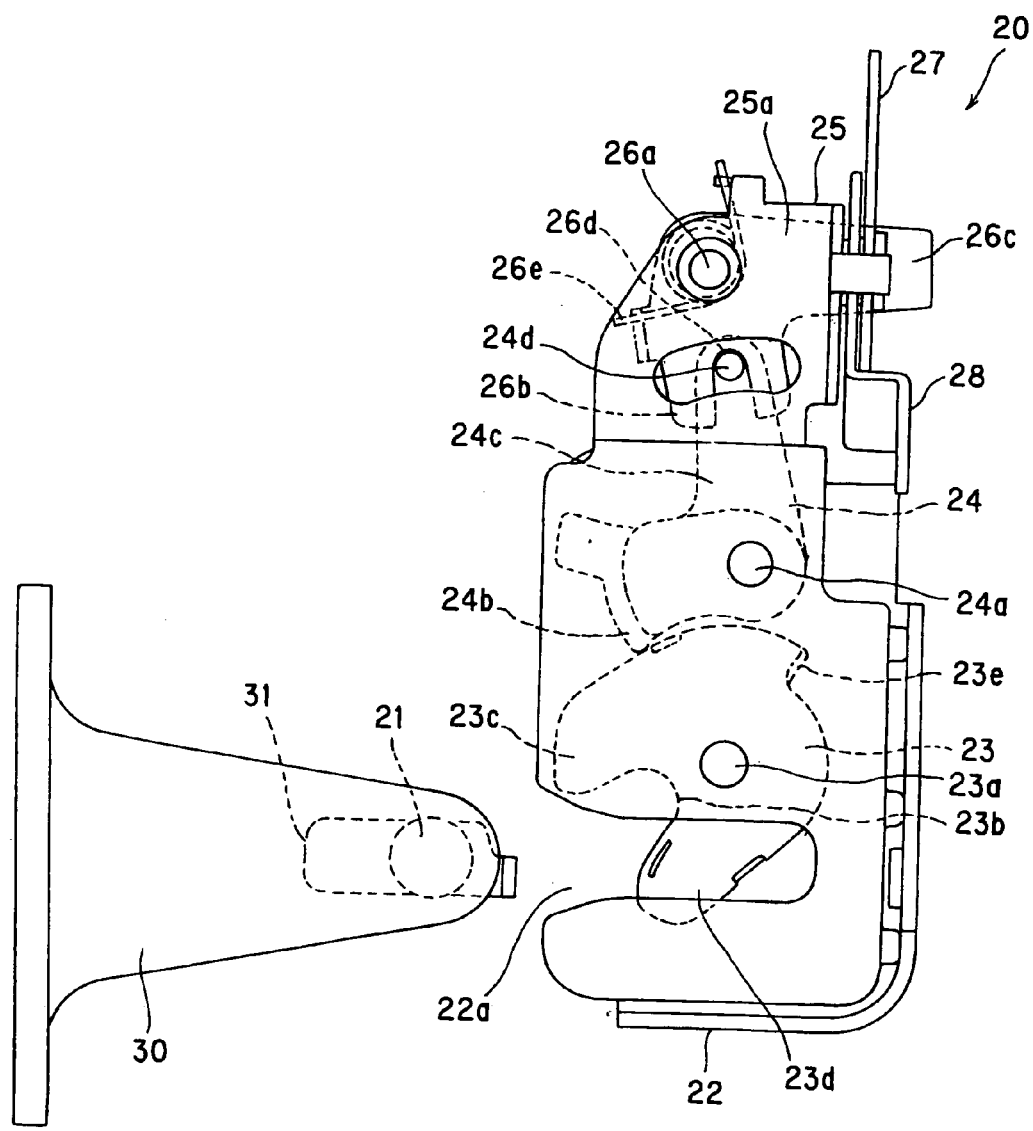
FIG. 7 is a drawing illustrating a left-hand side view of the horizontal hinge latch mechanism in a disengaged condition.
Figure 8:
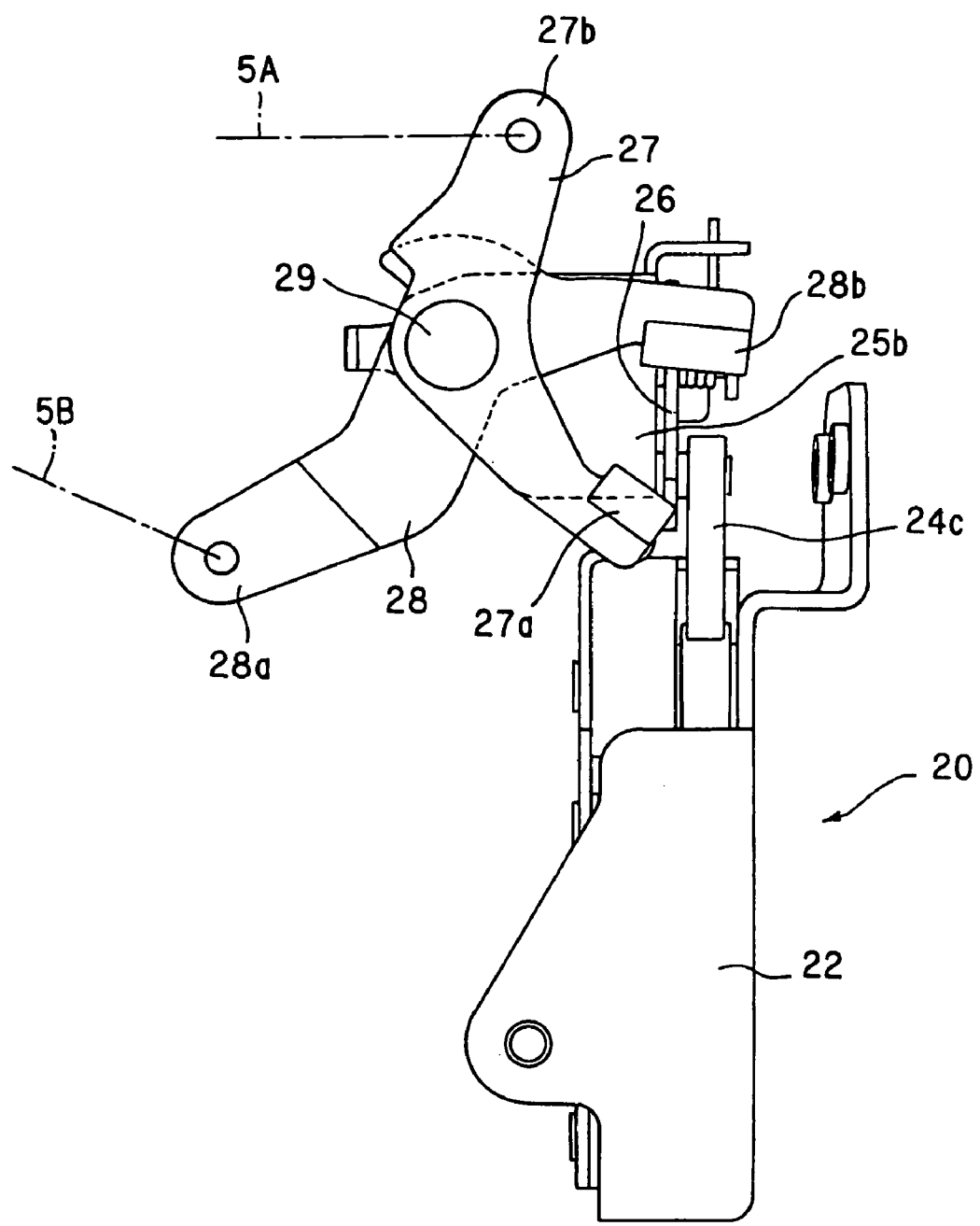
FIG. 8 is a drawing illustrating the horizontal hinge latch mechanism in the engaged condition viewed from the rear of the vehicle.
Figure 9:
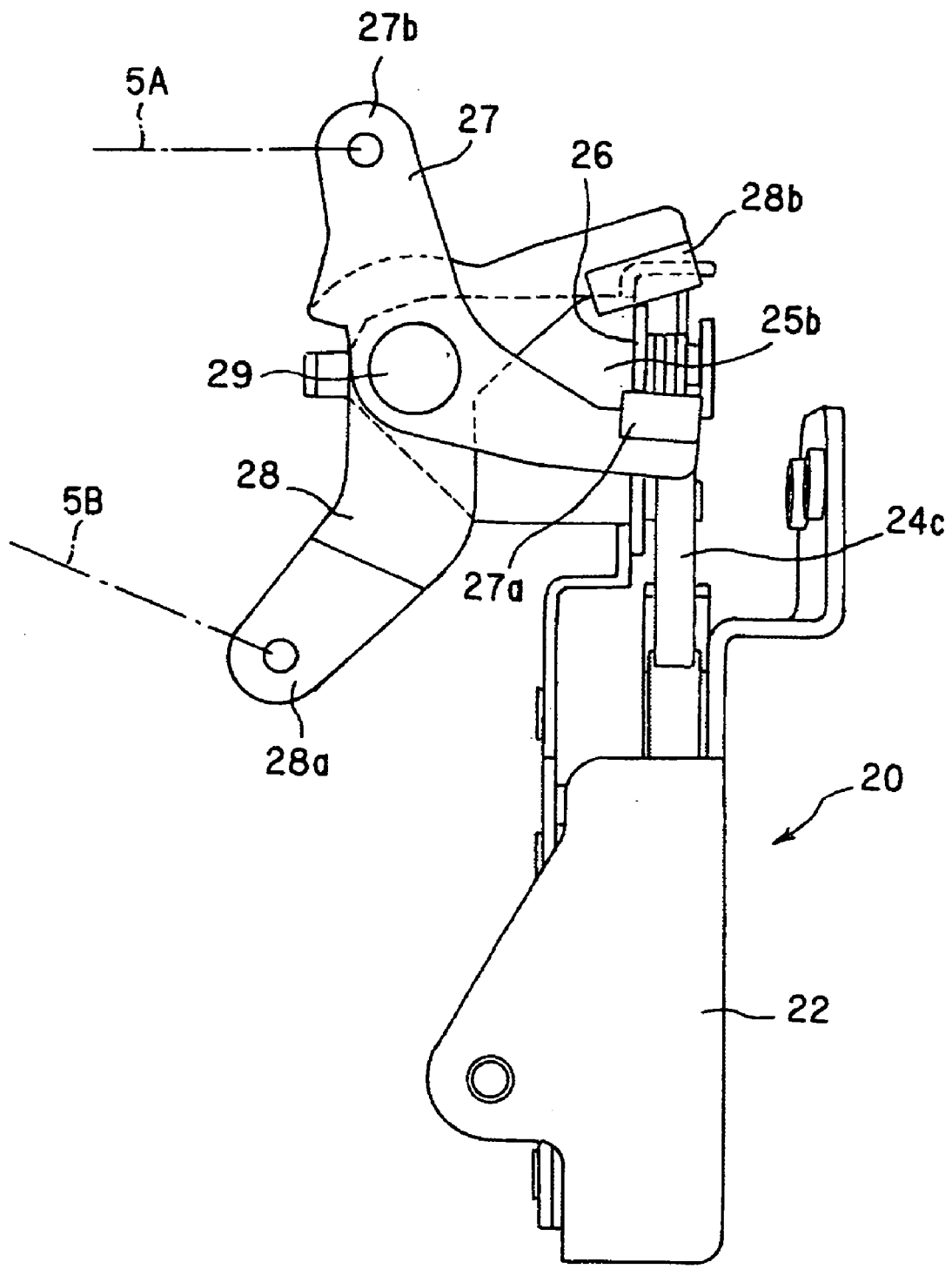
FIG. 9 is a drawing illustrating the horizontal hinge latch mechanism in the disengaged condition viewed from the rear of the vehicle.

The horizontal hinge latch mechanism (the first hinge latch mechanism) 20 is explained next. FIG. 6 is a drawing illustrating a left-hand side view of the horizontal hinge latch mechanism in an engaged condition. FIG. 7 is a drawing illustrating a left-hand side view of the horizontal hinge latch mechanism in a disengaged condition. FIG. 8 is a drawing illustrating the horizontal hinge latch mechanism in the engaged condition viewed from the rear of the vehicle. FIG. 9 is a drawing illustrating the horizontal hinge latch mechanism in the disengaged condition viewed from the rear of the vehicle.

The horizontal hinge latch mechanism 20 is provided on the lower right portion of the tailgate 1, as shown in FIG. 2. As shown in FIG. 6, the horizontal hinge latch mechanism 20 is disposed in such a way that it can engage with/disengage from a horizontal striker bar (engaging bar) 21 fixed to the vehicle body 4. The horizontal striker bar 21 is disposed on the same axis as the horizontal axis 3.

The horizontal hinge latch mechanism 20 has a housing 22 which is provided with a notch 22a extending substantially horizontally towards the compartment (that is, towards the front of the vehicle) of the vehicle body 4. The housing 22 houses a latch 23 and a ratchet 24.

At a position above the notch 22a of the housing 22, a latch bar 23a, which extends parallel to the horizontal axis 3, rotatably supports the latch 23 with respect to the housing 22. The latch 23 includes an engagement groove 23b, a first hooked portion 23c, a second hooked portion 23d, and an engagement unit 23e. As shown in FIG. 6, the engagement groove 23b is an opening in the exterior surface of the latch 23 towards the latch bar 23a and is wide enough to accommodate the horizontal striker bar 21. When the open end of the engagement groove 23b faces downward, the first hooked portion 23c is positioned more towards the compartment than the engagement groove 23b. When the open end of the engagement groove 23b faces downward, the second hooked portion 23d is positioned more away from the compartment (that is, towards the rear of the vehicle) than the engagement groove 23b. The engagement unit 23e is disposed on the exterior surface of the latch 23 diagonally opposite to the opening of the engagement groove 23b and is a notch formed due to the projection of the exterior surface of the latch 23 near the first hooked portion 23c in a radially outward direction of the latch bar 23a. A not shown latch spring is wound around the latch bar 23a in such a way that the latch 23 is always biased clockwise.

At a position above the latch bar 23a, a ratchet bar 24a, which extends parallel to the horizontal axis 3, rotatably supports the ratchet 24 with respect to the housing 22. The ratchet 24 includes an engagement member 24b and an action member 24c. As shown in FIG. 6, the engagement member 24b extends radially outwardly from the ratchet bar 24a towards the compartment. The action member 24c extends upwards radially outwardly from the ratchet bar 24a and the end of the action member 24c extends upwardly outside the housing 22. A latching pin 24d is provided at the end of the active member 24c. A not shown ratchet spring is wound around the ratchet bar 24a in such a way that the ratchet 24 is always biased counter-clockwise.

When the latch 23 is turned counter-clockwise, the first hooked portion 23c of the latch 23 moves across the notch 22a, as shown in FIG. 6. The extended edge of the engagement member 24b of the ratchet 24 engages with the engagement unit 23e of the latch 23 and engages the latch 23 in that position. When the latch 23 and the ratchet 24 are in the positions shown in FIG. 6, the horizontal striker bar 21 which moves in the notch 22a of the housing 22 is led towards the interior in the engagement groove 23b of the latch 23, and is prevented by the first hooked portion 23c from moving in the direction that would disengage the horizontal striker bar 21 from the engagement groove 23b and the notch 22a. As a result, the region of the tailgate 1 on which the horizontal hinge latch mechanism 20 is provided remains engaged (engaged condition) against the vehicle body 4.

When the latch 23 is turned clockwise, as shown in FIG. 7, the first hooked portion 23c of the latch 23 frees the notch 22a. The second hooked portion 23d then moves across the notch 22a and assumes a position whereby the second hooked portion 23d inclines upwards towards the interior (that is, away from the compartment) of the notch 22a. The clockwise turning of the latch 23 is caused by the bias force of the latch spring upon disengagement of the engagement unit 23e of the latch 23 from the engagement member 24b by the clockwise turning of the ratchet 24. When the latch 23 turns clockwise, the extended edge of the engagement member 24b of the ratchet 24 comes in contact with the protruding exterior surface of the latch 23. When the latch 23 and the ratchet 24 are in the positions shown in FIG. 7, the horizontal striker bar 21 can slide in and out of the notch 22a of the housing 22 and the engagement groove 23b of the latch 23. In other words, the horizontal striker bar 21 can now move in the direction in which it disengages from the engaged condition shown in FIG. 6. As a result, the region of the tailgate 1 on which the horizontal hinge latch mechanism 20 is provided disengages (disengaged condition) from the vehicle body 4. Upon entering the notch 22a in the disengaged condition shown in FIG. 7, the horizontal striker bar 21 comes in contact with the second hooked portion 23d, causing the latch to turn counter-clockwise, and moves interiorly in the engagement groove 23b to assume the engaged condition shown in FIG. 6.

In the engaged condition shown in FIG. 6, the end of the engagement member 24b is engaged with the engagement unit 23e of the latch 23. Consequently, the extended edge of the action member 24c of the ratchet 24 on which the latching pin 24d is provided stops at the position towards the compartment. In the disengaged condition shown in FIG. 7, the end of the engagement member 24b is in contact the protruding exterior surface of the latch 23. Consequently, the extended edge of the action member 24c on which the latching pin 24d is provided stops at the position away from the compartment.

A portion of the exterior wall of the housing 22 is extended upward to form a lever bracket 25. As shown in FIG. 6 and FIG. 8, the lever bracket 25 comprises a vertical bracket plate 25a perpendicular to the horizontal axis 3, and a horizontal bracket plate 25b parallel to the horizontal axis 3. A release lever 26, a release actuation lever 27, and a release detection lever 28 are mounted on the lever bracket 25.

As shown in FIG. 6, the release lever 26 is rotatably supported with respect to the vertical bracket plate 25a with the aid of a release lever bar 26a which is disposed parallel to the horizontal axis 3. The release lever 26 includes a release action member 26b and a release movement member 26c. The release action member 26b forms a U-shaped latching groove 26d into which the latching pin 24d of the action member 24c of the ratchet 24 engages. The release movement member 26c is extended towards the horizontal bracket plate 25b. A release lever spring 26e is wound around the release lever bar 26a in such a way that the release lever bar 26a is always biased counter-clockwise. The spring elastic force of the release lever bar 26e is comparatively weaker than that of the ratchet spring and hence does not resist the bias of the ratchet spring.

As shown in FIG. 8, the release actuation lever 27 is rotatably supported with respect to the horizontal bracket plate 25b with the aid of a lever bar 29 which is disposed perpendicular to the horizontal axis 3. The release actuation lever 27 includes an actuation action member 27a and an actuation movement member 27b. The actuation action member 27a extends radially outwardly from the lever bar 29 towards the release movement member 26c of the release lever 26, its extended edge coming in contact with the release movement member 26c. The actuation movement member 27b extends substantially upwardly and radially outwardly from the lever bar 29. One end of a horizontal hinge latch actuation link 5A, which may be a wire or a rod, is connected to the extended edge of the actuation movement member 27b. The other end of the horizontal hinge latch actuation link 5A is connected to the tailgate release-latch unit 90, as shown in FIG. 2.

As shown in FIG. 8, the release detection lever 28 is rotatably supported with respect to the horizontal bracket plate 25b with the aid of the lever bar 29 without interfering with the release actuation lever 27. The release detection lever 28 includes a detection action member 28a and a detection movement member 28b. The detection action member 28a extends substantially downwardly and radially outwardly from the lever bar 29. One end of a horizontal hinge latch detection link 5B, which may be a wire or a rod, is connected to the extended edge of the detection action member 28a. The detection movement member 28b extends radially upwardly from the lever bar 29 towards the release movement member 26c of the release lever 26, its extended edge coming in contact with the release movement member 26c. The release movement member 26c lies between the detection movement member 28b of the release detection lever 28 and the actuation action member 27a of the release actuation lever 27. The other end of the horizontal hinge latch detection link 5B is connected to the tailgate release-latch unit 90, as shown in FIG. 2.

When the release actuation lever 27 is turned counter-clockwise as shown in FIG. 9 from the engaged condition of the horizontal hinge latch mechanism 20 shown in FIG. 8, the release movement member 26c of the release lever 26 is pushed upwards, turning the release lever 26 counter-clockwise as shown in FIG. 7. The release action unit 26b of the release 26 moves the action member 24c of the ratchet 24 away from the compartment, turning the ratchet 24 clockwise. As a result, the latch 23 turns clockwise due to the bias force of the latch spring, disengaging the horizontal hinge latch mechanism 20. The tug on the horizontal hinge latch actuation link 5A connected to the actuation movement member 27b causes the release actuation lever 27 to turn counter-clockwise. When the horizontal hinge latch mechanism 20 assumes the disengaged condition, the release movement member 26c of the release lever 26 is pushed upward, which in turn pushes the detection action member 28a of the release detection lever 28 upward. This upward movement of the detection action member 28a tugs the horizontal hinge latch detection link 5B towards the direction causing. When the horizontal hinge latch mechanism 20 is in the disengaged condition, the action member 24c of the ratchet 24 stops at the position away from the compartment, causing the release detection lever 28 that is restrained by the release lever 26 to stop at the position of disengaged condition shown in FIG. 9.

Figure 28:
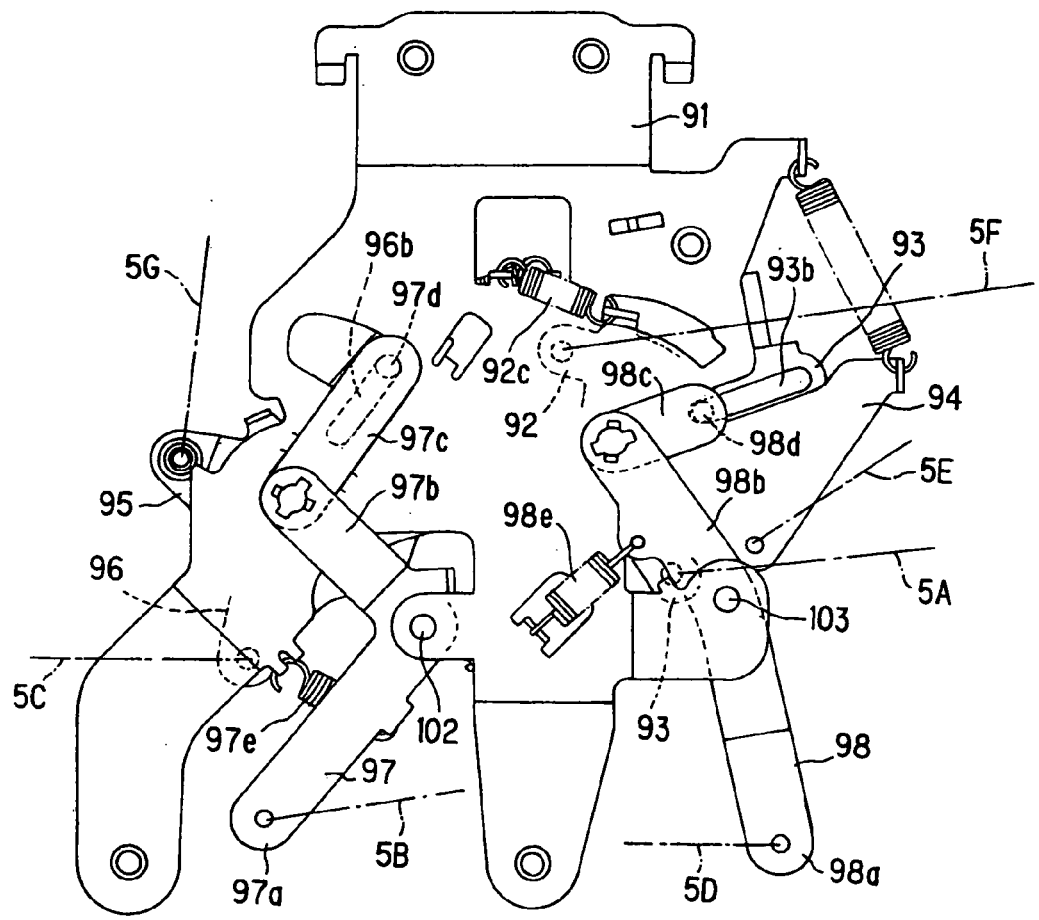
FIG. 28 is a drawing illustrating the tailgate release-latch unit viewed from the rear of the vehicle.
Figure 29:
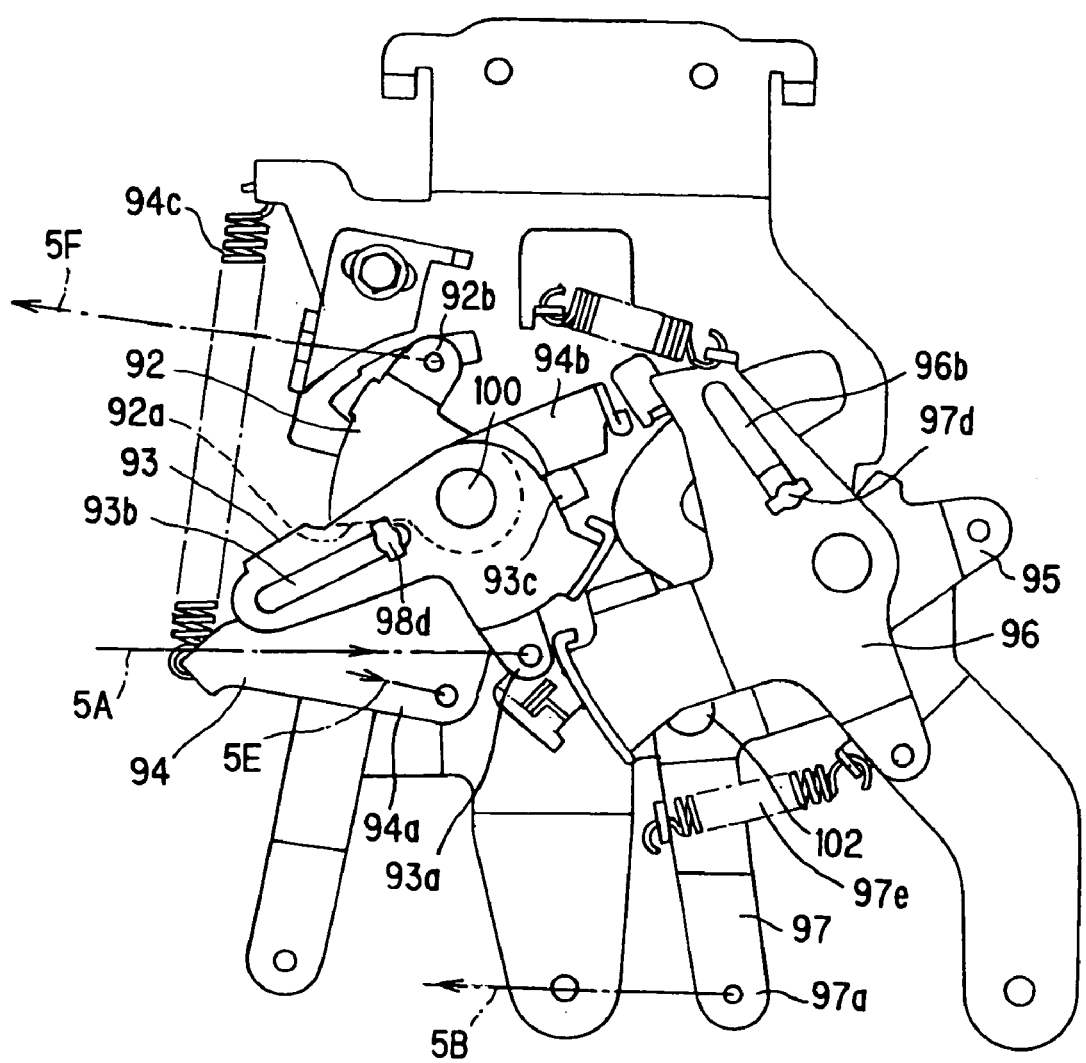
FIG. 29 through FIG. 35 are drawings illustrating the actuation of the tailgate release-latch unit.

When the horizontal hinge latch mechanism 20 goes from the disengaged condition shown in FIG. 9 to the engaged condition, the action member 24c of the ratchet 24 stops at the position towards the compartment, causing the release lever 26 to turn clockwise. The clockwise turning of the release lever 26 pushes down the actuation action member 27a of the release actuation lever 27 as shown in FIG. 28, causing the actuation lever 27 to turn clockwise. This frees the release detection lever 28 from the restraining release lever 26 and the release detection lever 28 can now turn clockwise from the disengaged condition shown in FIG. 9.

Figure 10:
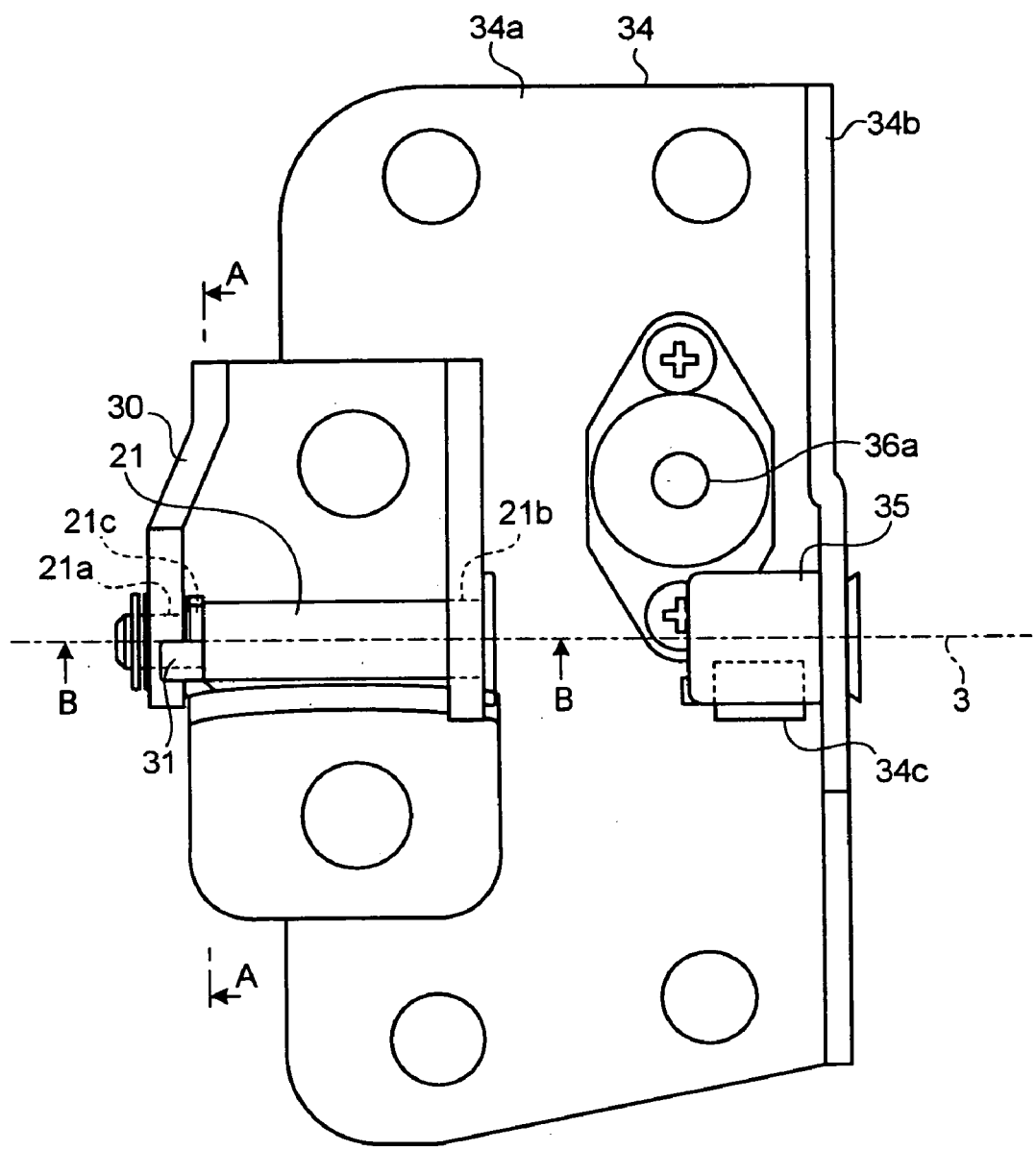
FIG. 10 is a drawing illustrating the structure of a horizontal striker bar viewed from the rear of the vehicle.
Figure 11:
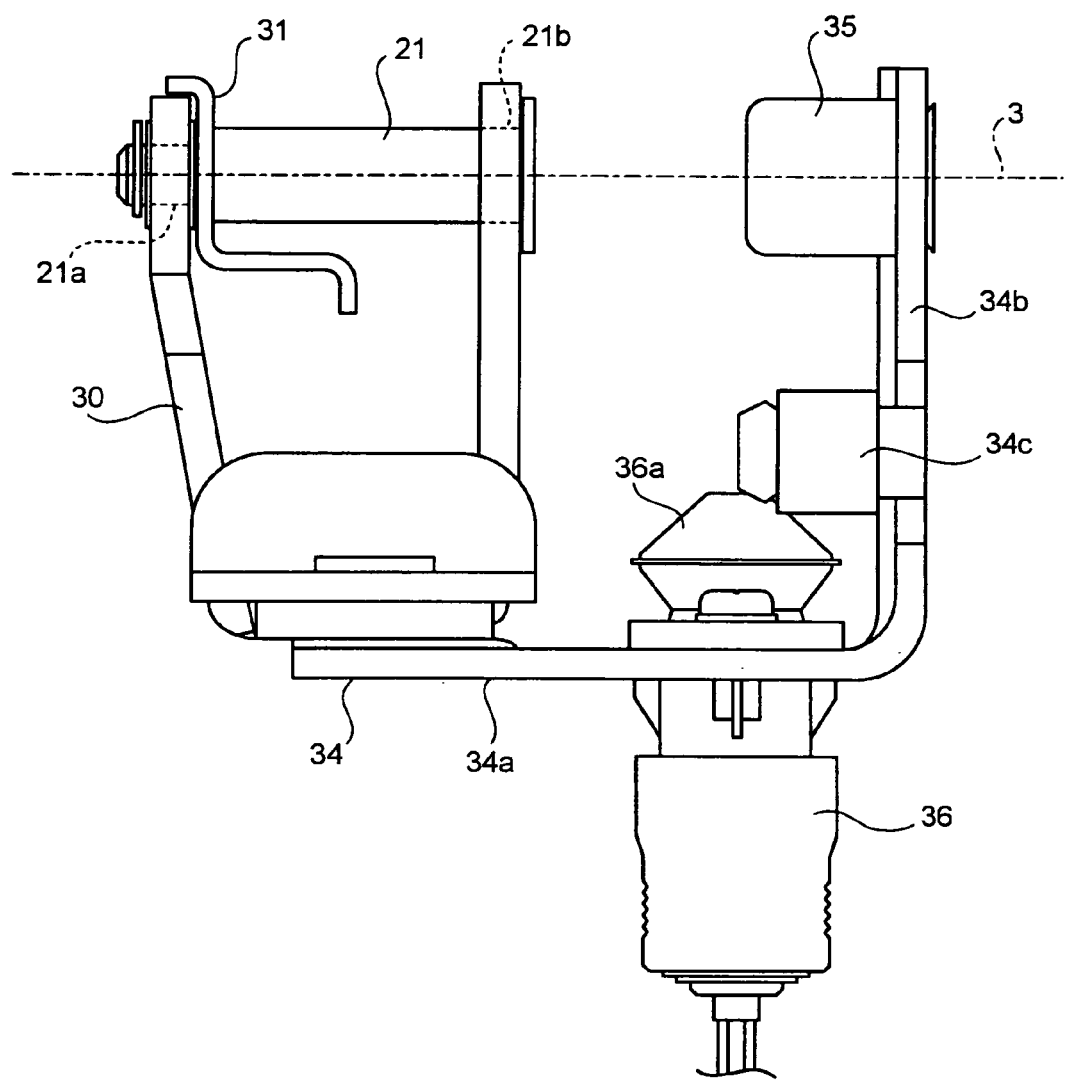
FIG. 11 is a drawing illustrating the structure of the horizontal striker bar viewed from below the vehicle.
Figure 12:
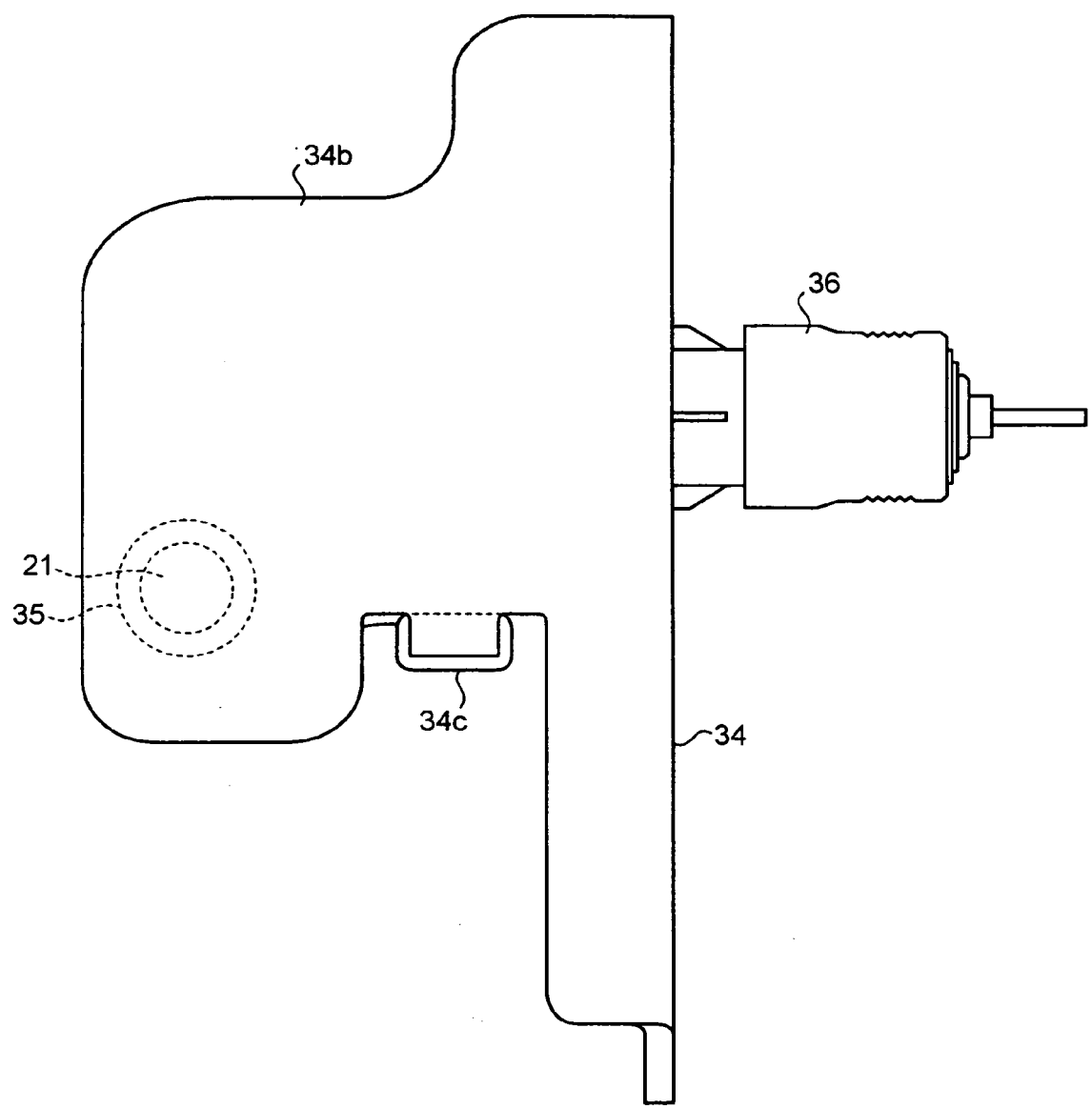
FIG. 12 is a drawing illustrating the structure of the horizontal striker bar viewed from the right side.
Figure 13:
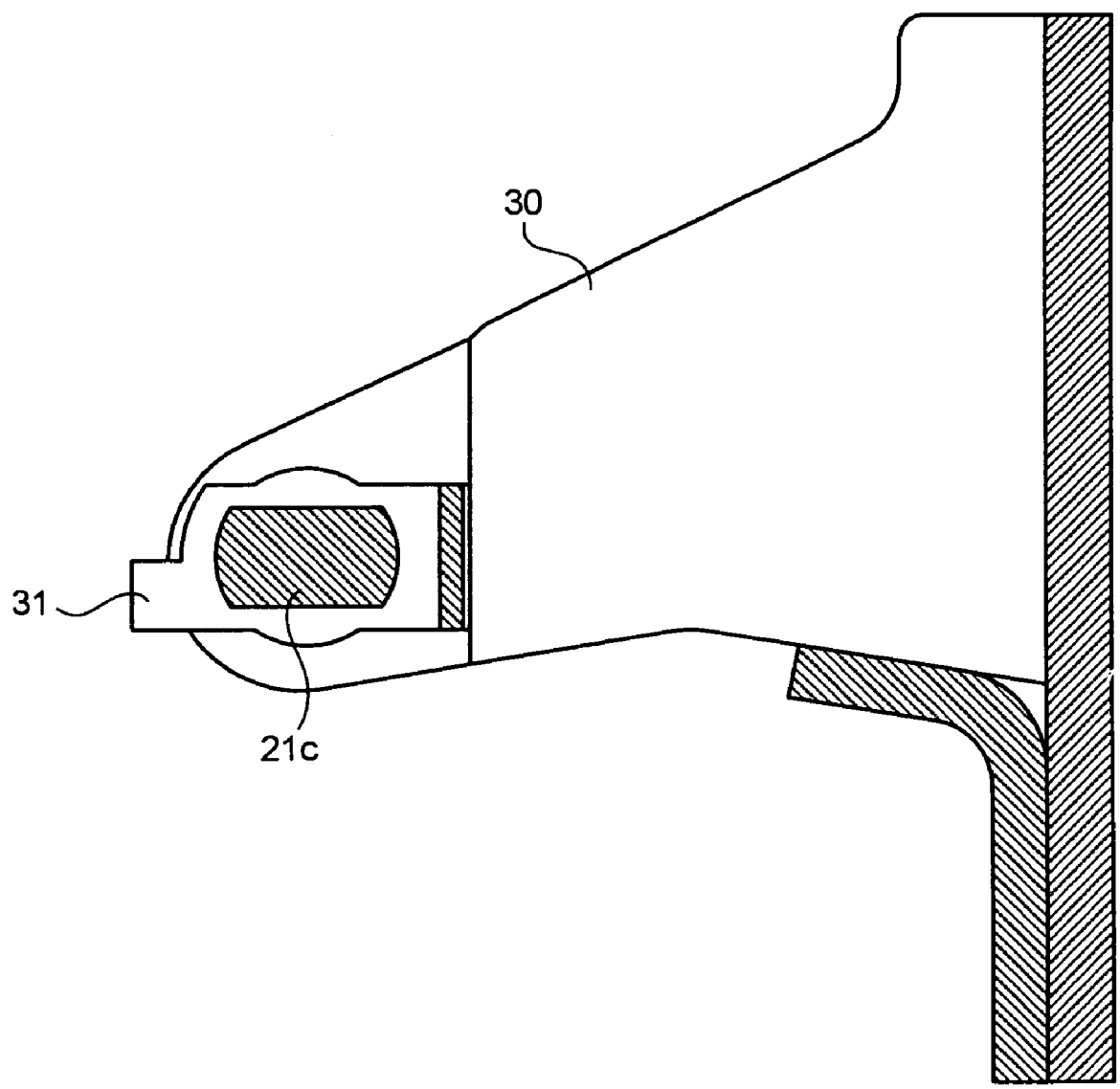
FIG. 13 is a drawing illustrating a cross-sectional view of the horizontal striker bar cut along the line A—A in FIG. 10.
Figure 14:
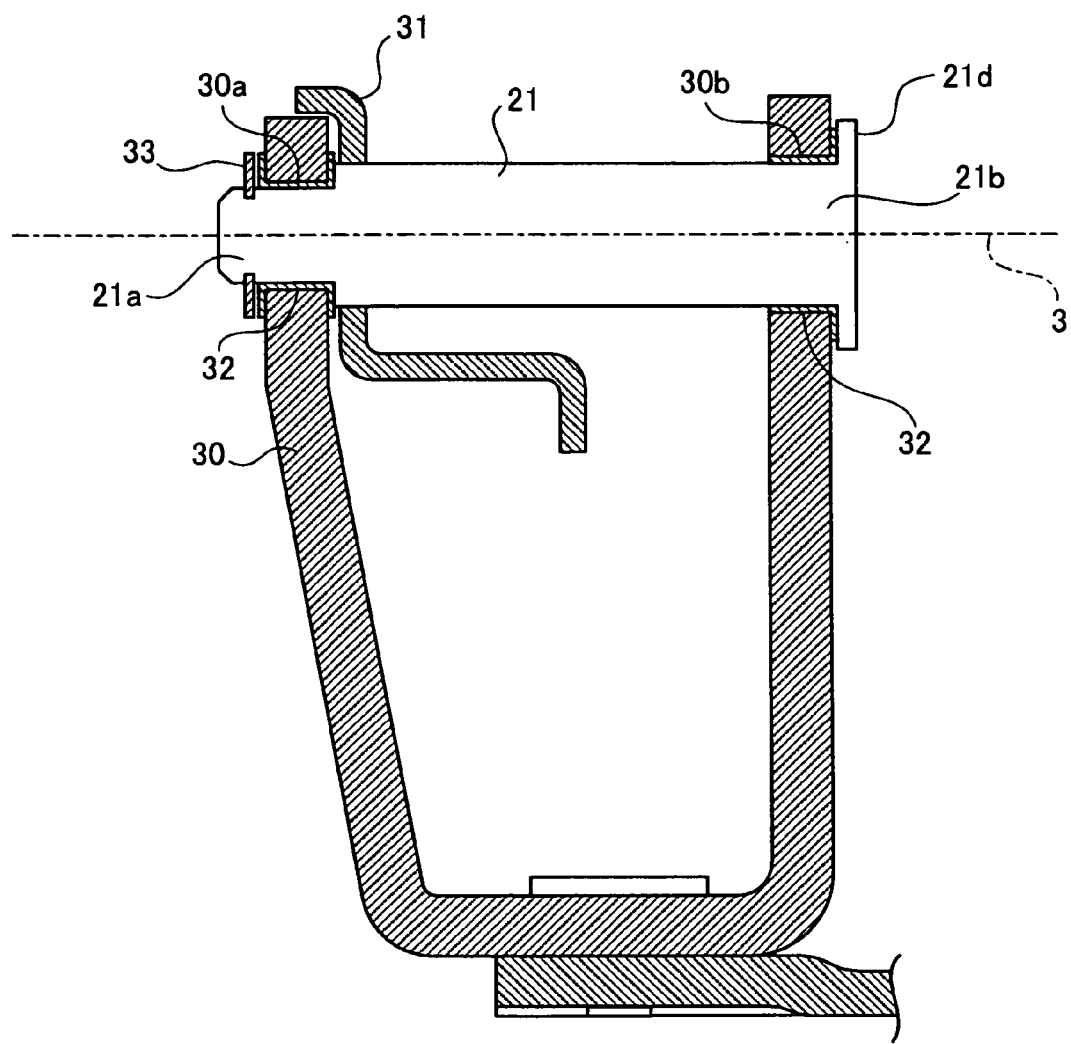
FIG. 14 is a drawing illustrating a cross-sectional view of the horizontal striker bar cut along the line B—B in FIG. 10.
Figure 15:
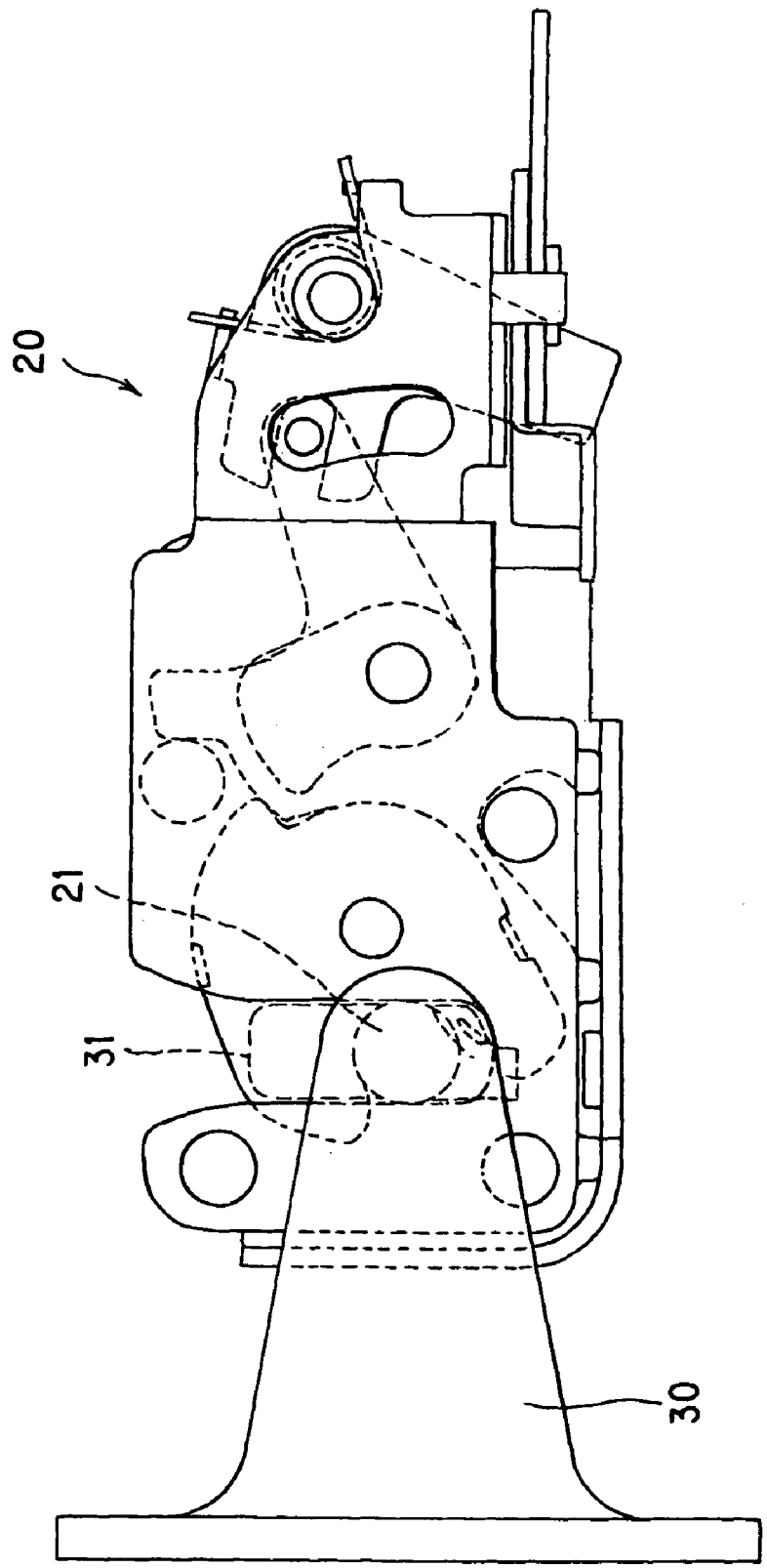
FIG. 15 is a drawing illustrating a left-hand side view of the horizontal hinge latch mechanism turned about the horizontal striker bar.

The structure of the horizontal striker bar (engaging bar) 21 is explained next. FIG. 10 is a drawing illustrating the structure of the horizontal striker bar viewed from the rear of the vehicle. FIG. 11 is a drawing illustrating the structure of the horizontal striker bar viewed from below the vehicle. FIG. 12 is a drawing illustrating the structure of the horizontal striker bar viewed from the right side. FIG. 13 is a drawing illustrating a cross-sectional view of the horizontal striker bar cut along the line A—A in FIG. 10. FIG. 14 is a drawing illustrating a cross-sectional view of the horizontal striker bar cut along the line B—B in FIG. 10. FIG. 15 is a drawing illustrating a left-hand side view of the horizontal hinge latch mechanism turned about the horizontal striker bar.

As shown in FIG. 10 through FIG. 12, the horizontal striker bar 21 has a first end 21a and a second end 21b which are supported between two facing plates of a striker supporting member 30. When viewed from below, the striker supporting member 30 is open-box-shaped with the open end facing the compartment. A portion of the first end 21a of the horizontal striker bar 21 is narrowed and forms an engagement member 21c the cross section of which is like a circle flattened from top and bottom. An engaging lever 31 engages with the engagement member 21c. In other words, the engaging lever 31 is engaged non-rotatably against the horizontal striker bar 21. The width of the engaging lever 31 matches the notch 22a of the housing 22 of the horizontal hinge latch mechanism 20. The engaging lever 31 wraps halfway around the horizontal striker bar 21.

As shown in FIG. 14, the first end 21a of the horizontal striker bar 21 is narrower than the rest of the horizontal striker bar 21 and engages with the engaging lever 31. The second end 21b of the horizontal striker bar 21 has a uniform width, matching with the width of the rest of the horizontal striker bar 21. The first end 21a and the second end 21b of the horizontal striker bar 21 are rotatably inserted in shaft slots 30a and 30b provided in the facing plates of the striker supporting member 30 with the aid of a pair of sliding shaft-bearing members 32. The sliding shaft-bearing members 32 are made of a metal mesh impregnated with a resin material (a tetrafluoroethylene resin, for instance), the material enabling the horizontal striker bar 21 to rotate with least friction in the shaft slots 30a and 30b of the striker supporting member 30. A retaining ring 33 is fitted at the first end 21a of the horizontal striker bar 21 to prevent it from slipping from the shaft slot 30a of the striker supporting member 30. Similarly, a retaining flange is provided at the second end 21b of the horizontal striker bar 21 to prevent it from slipping from the shaft slot 30b of the striker supporting member 30.

The engaging lever 31 engages with the notch 22a, as shown in FIG. 6. When the engaging lever 31 is engaged with the notch 22a, the housing 22 is disposed between the facing plates of the striker supporting member 30, as shown in FIG. 15. When the horizontal hinge latch mechanism 20 in the engaged condition turns about the horizontal striker bar 21, the engaging lever 31 engages with the notch 22a and turns as well. The turning of the engaging lever 31 causes the horizontal striker bar 21 to turn as well. As a result, the horizontal striker bar 21 rotates with least friction along with the horizontal hinge latch mechanism 20 with the aid of the sliding shaft-bearing members 32.

Thus, the horizontal hinge latch mechanism 20 in the engaged condition is rotatable clockwise (away from the compartment) about the horizontal striker bar 21. As mentioned above, the horizontal striker bar 21 is on the same axial line as the horizontal axis 3. In other words, the horizontal striker bar 21 which forms the axis of rotation of the horizontal hinge latch mechanism 20 is on the same axial line as the horizontal shaft 14 of the biaxial hinge 10. As a result, the horizontal hinge latch mechanism 20 in the engaged condition and the horizontal shaft 14 of the biaxial hinge 10 are able to support the flap-type downward release of the tailgate 1 with respect to the vehicle body 4.

As shown in FIG. 11 through FIG. 13, the striker supporting member 30 is fixed to the vehicle body 4 with the aid of a striker fixing member 34. When viewed from below, the striker fixing member 34 is L-shaped, with the striker supporting member 30 being fixed to a first face 34a of the striker fixing member 34 that is facing the vehicle body 4 on the surface away from the compartment (that is, towards the rear of the vehicle). A second face 34b of the striker fixing member 34 extends away from the compartment (that is, towards the rear of the vehicle) and is perpendicular to the horizontal axis 3. There is a predetermined space separating the second face 34b and the striker supporting member 30. A supporting member 35 is provided on the second face 34b on the surface facing the striker supporting member 30 on the same axial line as the horizontal axis 3 (that is, the same axial line as the horizontal striker bar 21). A switch assembly 36 is provided on the first face 34a between the second face 34b and the striker supporting member 30. An actuating part 36a of the switch assembly 36 protrudes from the first face 34a away from the compartment (that is, towards the rear of the vehicle). The switch assembly 36 may, for instance, be in an OFF condition when the horizontal hinge latch mechanism 20 is in the engaged condition and an ON condition when the horizontal hinge latch mechanism 20 is in the disengaged condition lighting a not shown warning lamp provided in the compartment of the vehicle body 4. The second face 34b of the striker fixing member 34 has a stopper 34c extending towards the striker supporting member 30.

Figure 16:
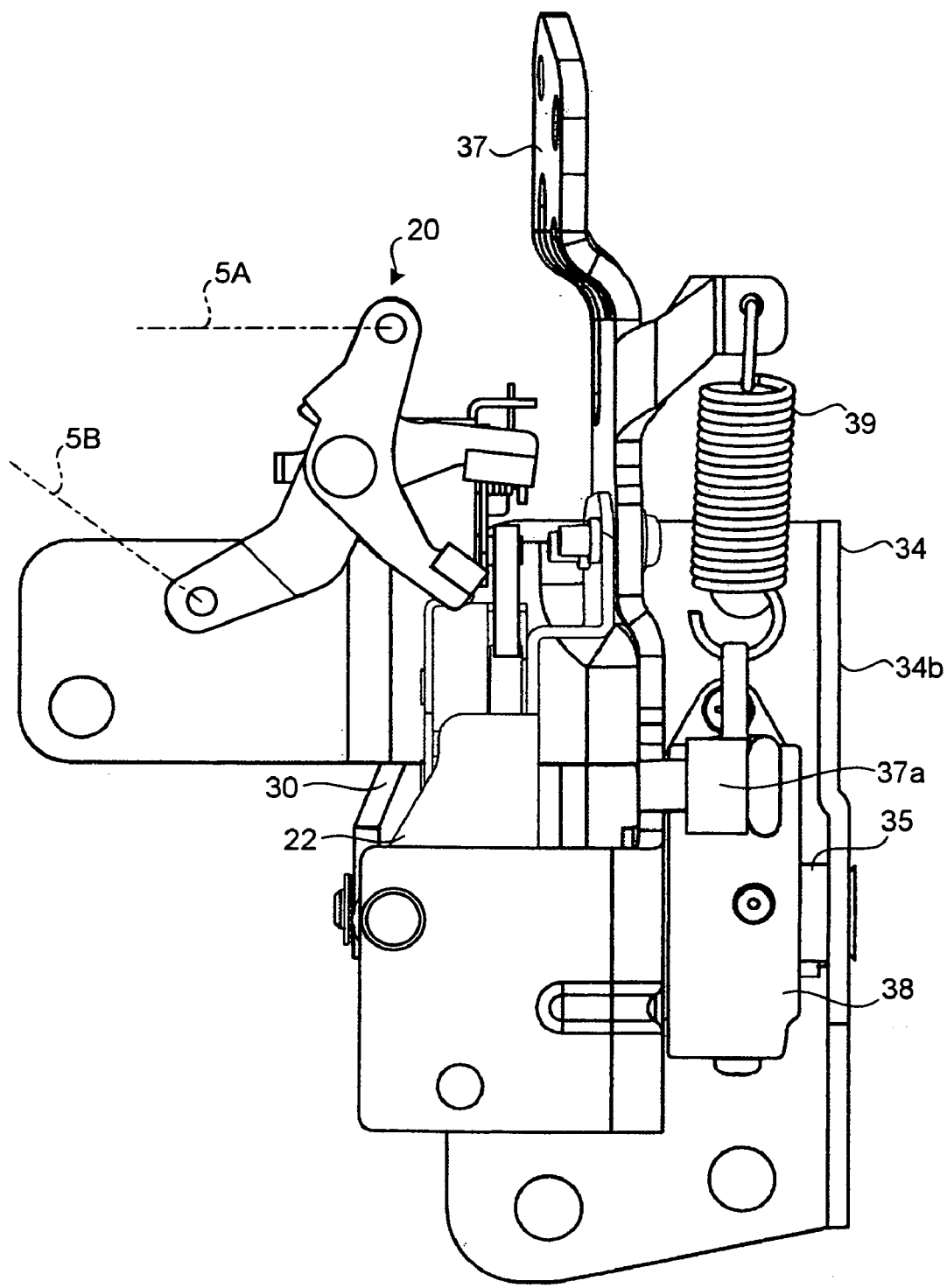
FIG. 16 is a drawing illustrating the horizontal hinge latch mechanism in relation to a switch assembly viewed from the rear of the vehicle.
Figure 17:
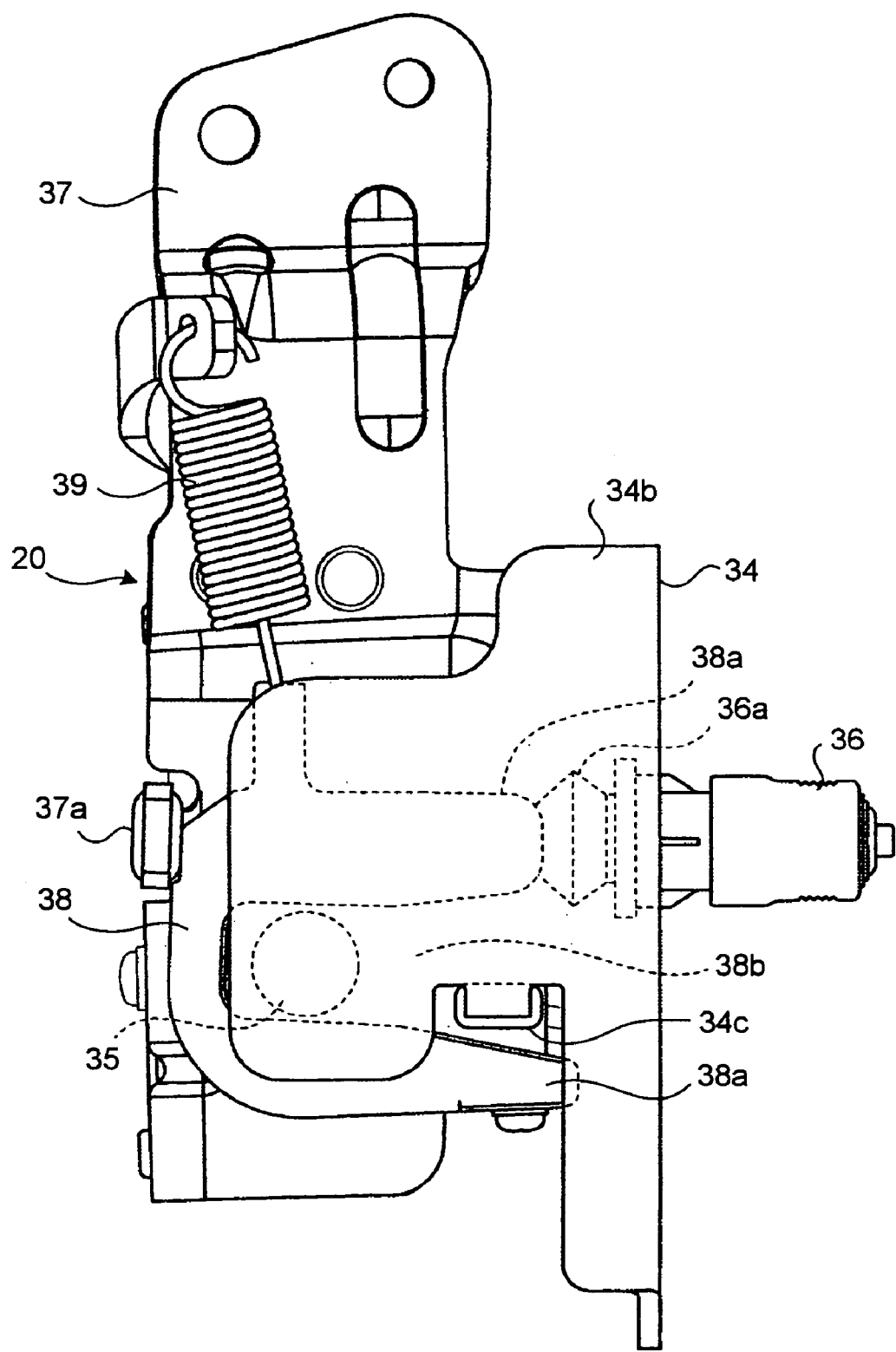
FIG. 17 is a drawing illustrating a right-hand side view of the structure of the horizontal hinge latch mechanism in relation to the switch assembly.
Figure 18:
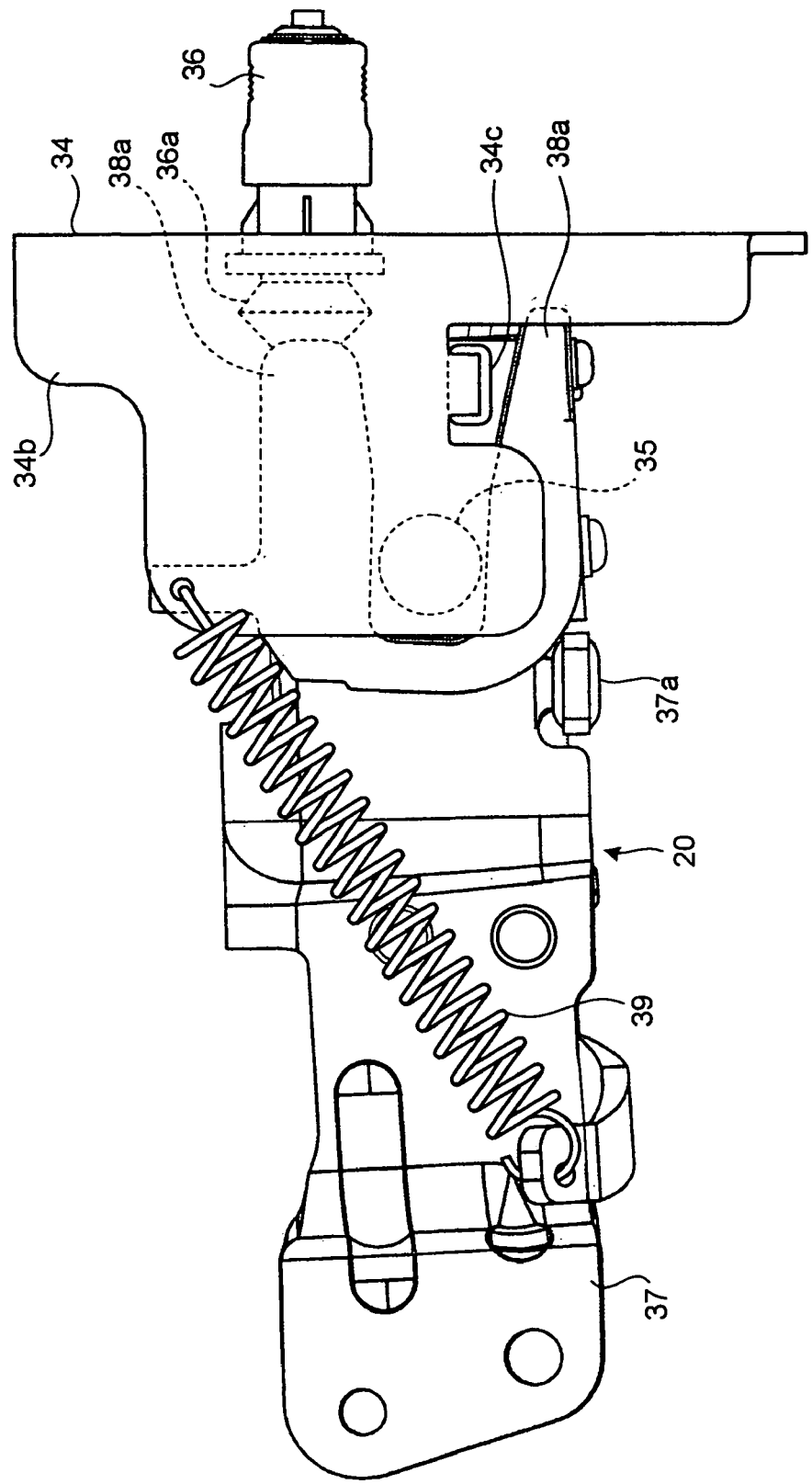
FIG. 18 is a drawing illustrating a right-hand side view of the horizontal hinge latch mechanism in relation to the switch assembly when the horizontal hinge latch mechanism turns about the horizontal striker bar.

The structure of the horizontal hinge latch mechanism in relation to the switch assembly is explained next. FIG. 16 is a drawing illustrating the horizontal hinge latch mechanism in relation to the switch assembly viewed from the rear of the vehicle. FIG. 17 is a drawing illustrating a right-hand side view of the structure of the horizontal hinge latch mechanism in relation to the switch assembly. FIG. 18 is a drawing illustrating a right-hand side view of the horizontal hinge latch mechanism in relation to the switch assembly when the horizontal hinge latch mechanism turns about the horizontal striker bar.

As shown in FIG. 16 and FIG. 17, the housing 22 of the horizontal hinge latch mechanism 20 is mounted on a hinge latch fixing member 37 which in turn is fixed to the tailgate 1. When the horizontal hinge latch mechanism 20 is in the engaged condition with the horizontal striker bar 21, the hinge latch fixing member 37 is not in contact with the striker supporting member 30, and a main part of the hinge latch fixing member 37 are disposed between the striker supporting member 30 and the striker fixing member 34. A switch actuating member 38 is mounted in the main part of the hinge latch fixing member 37. The switch actuating member 38 is open-box-shaped with a pair of arms 38a and a groove 38b in between. The groove 38b is of a width that can accommodate the supporting member 35 of the striker fixing member 34. The switch actuating member 38 is rotatably supported with the aid of the hinge latch fixing member 37 about the horizontal axis 3 when the horizontal hinge latch mechanism 20 is in an engaged condition. In FIG. 17, the switch actuating member 38 is illustrated as being biased counter-clockwise by a tension spring 39 provided between the hinge latch fixing member 37 and the switch actuating member 38, and the opening of the groove 38b is shown oriented towards the same direction as the notch 22a of the housing 22. This condition is maintained especially when the horizontal hinge latch mechanism 20 in the disengaged condition.

When the horizontal hinge latch mechanism 20 assumes the engaged condition, the switch actuating member 38 houses the supporting member 35 in the groove 38b, and turns off the switch assembly 36 by pushing the actuating part 36a of the switch assembly 36 provided at the end of an arm 38a. When the horizontal hinge latch mechanism 20 turns counter-clockwise about the horizontal striker bar 21 as shown in FIG. 18, tension is created in the switch actuating member 38 which also turns counter-clockwise along with the horizontal hinge latch mechanism 20 by the tension spring 39. However, the turning stops when the one arm 38a is in contact with the stopper 34c provided on the striker fixing member 34. By this action, the actuating part 36a of the switch assembly 36 provided at the end of the other arm 38a remains pressed, maintaining the switch assembly in the OFF condition. This is not illustrated but when the horizontal hinge latch mechanism 20 is in the disengaged condition, the switch actuating member 38 disengages the supporting member 35 from the groove 38b and releases the actuating part 36a of the switch assembly 36 provided at the end of one arm 38a, turning on the switch assembly 36.

Figure 19:
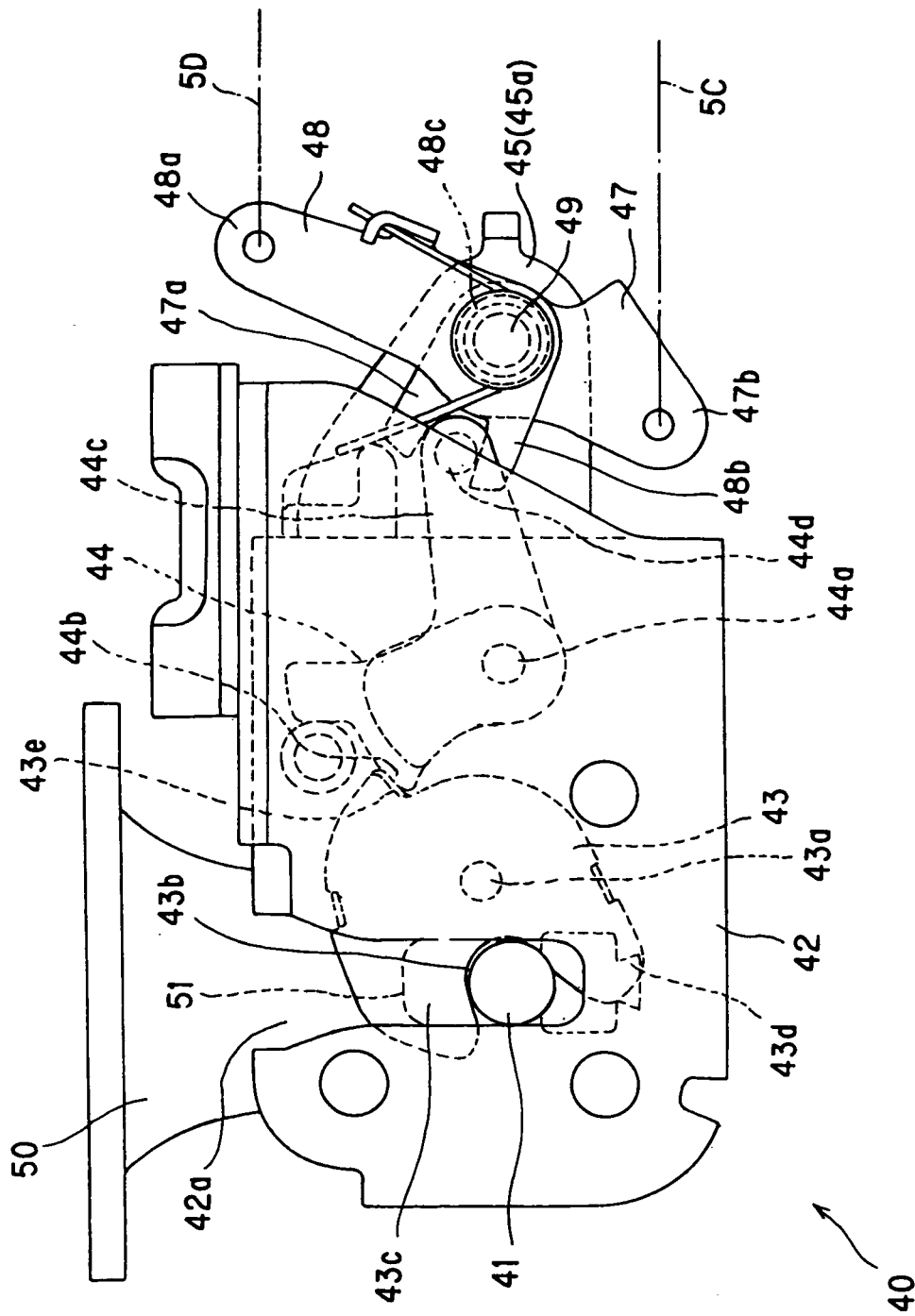
FIG. 19 is a drawing illustrating a vertical hinge latch mechanism viewed from the rear of the vehicle.
Figure 20:
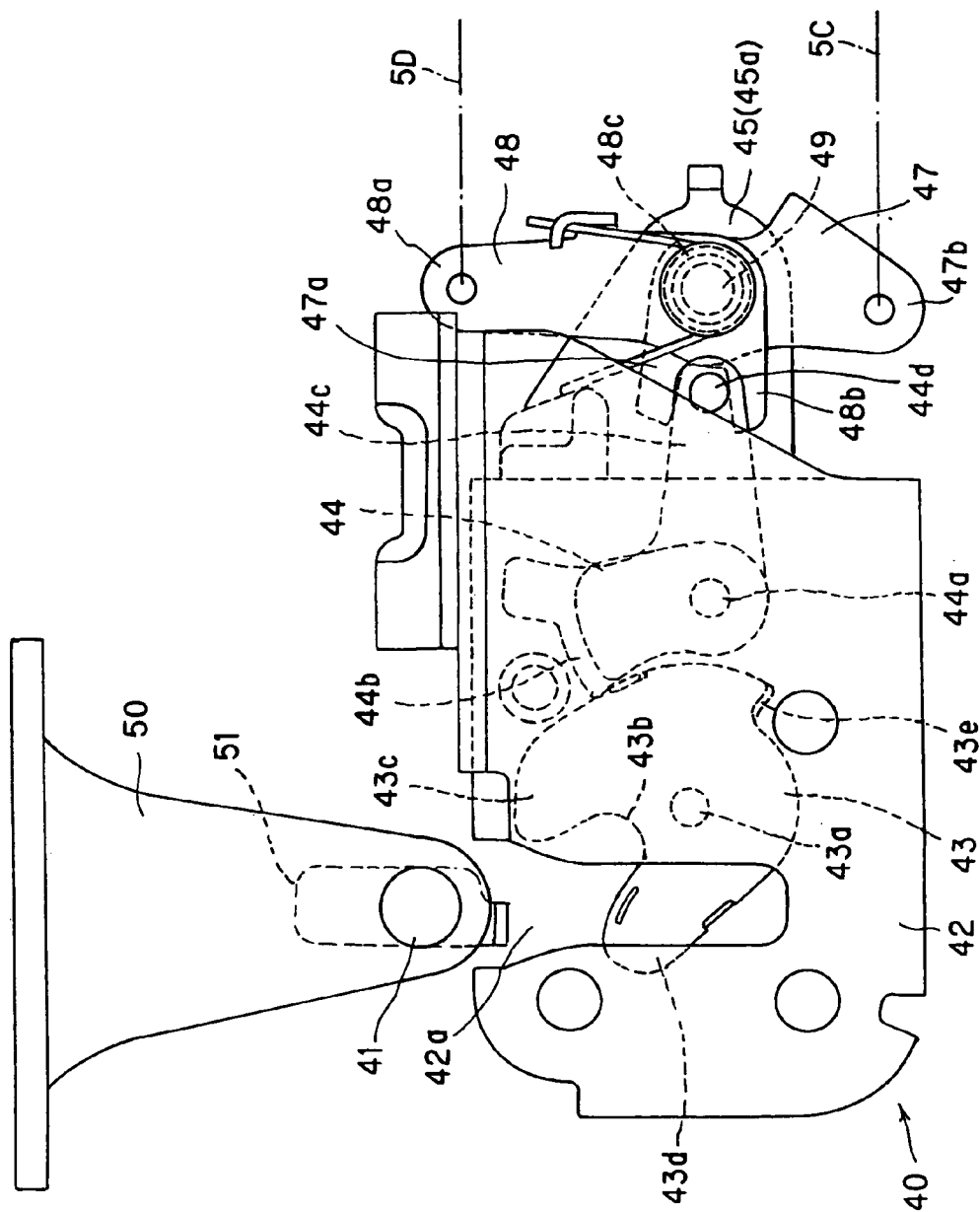
FIG. 20 is a drawing illustrating the vertical hinge latch mechanism viewed from the top of the vehicle.

The vertical hinge latch mechanism (the second hinge latch mechanism) 40 is explained next. FIG. 19 is a drawing illustrating the vertical hinge latch mechanism viewed from the rear of the vehicle. FIG. 20 is a drawing illustrating the vertical hinge latch mechanism viewed from the top of the vehicle.

The vertical hinge latch mechanism 40 is provided in the upper left portion of the tailgate 1, as shown in FIG. 2. As shown in FIG. 19, the vertical hinge latch mechanism 40 is disposed in such a way that it can engage with/disengage from a vertical striker bar (engaging bar) 41 fixed to the vehicle body 4. The vertical striker bar 41 is disposed on the same axis as the vertical axis 2.

The vertical hinge latch mechanism 40 has a housing 42 which is provided with a notch 42a extending substantially horizontally towards the compartment (that is, towards the front of the vehicle) of the vehicle body 4. The housing 42 houses a latch 43 and a ratchet 44.

At a position above the notch 42a of the housing 42, a latch bar 43a, which extends parallel to the vertical axis 2, rotatably supports the latch 43 with respect to the housing 42. The latch 43 includes an engagement groove 43b, a first hooked portion 43c, a second hooked portion 43d, and an engagement unit 43e. As shown in FIG. 19, the engagement groove 43b is an opening in the exterior surface of the latch 43 towards the latch bar 43a and is wide enough to accommodate the vertical striker bar 41. When the opening of the engagement groove 43b faces leftward, the first hooked portion 43c is positioned more towards the compartment than the engagement groove 43b. When the open end of the engagement groove 43b faces leftward, the second hooked portion 43d is positioned more away from the compartment (that is, towards the rear of the vehicle) than the engagement groove 43b. The engagement unit 43e is disposed on the exterior surface of the latch 43 diagonally opposite to the opening of the engagement groove 43b and is a notch formed due to the projection of the exterior surface of the latch 43 near the first hooked portion 43c in a radially outward direction of the latch bar 43a. A not shown latch spring is wound around the latch bar 43a in such a way that the latch 43 is always biased clockwise.

At a position above the latch bar 43a, a ratchet bar 44a, which extends parallel to the vertical axis 2, rotatably supports the ratchet 44 with respect to the housing 42. The ratchet 44 includes an engagement member 44b and an action member 44c. As shown in FIG. 19, the engagement member 44b extends radially outwardly from the ratchet bar 44a towards the compartment. The action member 44c extends to the right radially outwardly from the ratchet bar 44a and the end of the action member 44c extends to the right outside the housing 42. A latching pin 44d is provided at the end of the active member 44c. A not shown ratchet spring is wound around the ratchet bar 44a in such a way that the ratchet 44 is always biased counter-clockwise.

When the latch 43 is turned counter-clockwise, the first hooked portion 43c of the latch 43 moves across the notch 42a, as shown in FIG. 19. The extended edge of the engagement member 44b of the ratchet 44 engages with the engagement unit 43e of the latch 43 and engages the latch in that position. When the latch 43 and the ratchet 44 are in the positions shown in FIG. 19, the vertical striker bar 41 which moves in the notch 42a of the housing 42 is led towards the interior in the engagement groove 43b of the latch 43, and is prevented by the first hooked portion 43c from moving in the direction that would disengage the vertical striker bar 41 from the engagement groove 43b and the notch 42a. As a result, the region of the tailgate 1 on which the vertical hinge latch mechanism 40 is provided remains engaged (engaged condition) against the vehicle body 4.

When the latch 43 is turned counter-clockwise, as shown in FIG. 20, the first hooked portion 43c of the latch 43 frees the notch 42a. The second hooked portion 43d then moves across the notch 42a and assumes a position whereby the second hooked portion 43d inclines to the right towards the interior (that is, away from the compartment) of the notch 42a. The clockwise turning of the latch 43 is caused by the bias force of the latch spring upon disengagement of the engagement unit 43e of the latch 43 from the engagement member 44b by the clockwise turning of the ratchet 44. When the latch 43 turns clockwise, the extended edge of the engagement member 44b of the ratchet 44 comes in contact with the protruding exterior surface of the latch 43. When the latch 43 and the ratchet 44 are in the positions shown in FIG. 20, the vertical striker bar 41 can slide in and out of the notch 42a of the housing 42 and the engagement groove 43b of the latch 43. In other words, the vertical striker bar 41 can now move in the direction in which it disengages from the engaged condition shown in FIG. 19. As a result, the region of the tailgate 1 on which the vertical hinge latch mechanism 40 is provided disengages (disengaged condition) from the vehicle body 4. Upon entering the notch 42a in the disengaged condition shown in FIG. 20, the vertical striker bar 41 comes in contact with the second hooked portion 43d, causing the latch to turn counter-clockwise, and moves interiorly in the engagement groove 43b to assume the engaged condition shown in FIG. 19.

In the engaged condition shown in FIG. 19, the end of the engagement member 44 is engaged with the engagement unit 43e of the latch 43. Consequently, the extended edge of the action member 44c of the ratchet 44 on which the latching pin 44d is provided stops at the position towards the compartment. In the disengaged condition shown in FIG. 20, the end of the engagement member 44b is in contact the protruding exterior surface of the latch 43. Consequently, the extended edge of the action member 44c on which the latching pin 44d is provided stops at the position away from the compartment.

A portion of the exterior wall of the housing 42 is extended upward to form a lever bracket 45. As shown in FIG. 19, the bracket 45 has a bracket plate 45a perpendicular to the vertical axis 2. A release lever 46, a release actuation lever 47, and a release detection lever 48 are mounted on the lever bracket 45.

As shown in FIG. 19, the release actuation lever 47 is rotatably supported with respect to the bracket plate 45a with the aid of a lever bar 49 which is disposed parallel to the vertical axis 2. The release actuation lever 47 includes an actuation action member 47a and an actuation movement member 47b. The actuation action member 47a extends radially outwardly from the lever bar 49 towards the action member 44c of the ratchet 44, its extended edge coming in contact with the latching pin 44d. The actuation movement member 47b extends substantially downwardly outwardly from the lever bar 49. The extended edge of the actuation movement member 47b is connected to one end of a vertical hinge latch actuation link 5C, which may be a wire or a rod. The other end of the vertical hinge latch actuation link 5C is connected to the tailgate release-latch unit 90, as shown in FIG. 2.

As shown in FIG. 19, the release detection lever 48 is rotatably supported with respected to the bracket plate 45a with the aid of the lever bar 49 without interfering with the release actuation lever 47. The release detection lever 48 includes a detection action member 48a and a detection movement member 48b. The detection action member 48a extends substantially upwardly and radially outwardly from the lever bar 49. One end of a vertical hinge latch detection link 5D, which may be a wire or a rod, is connected to the extended edge of the detection action member 48a. The detection movement member 48b extends radially outwardly from the lever bar 49 towards the action member 44c of the ratchet 44, its extended edge coming in contact with the latching pin 44d. The latching pin 44d lies between the detection movement member 48b of the release detection lever 48 and the actuation action member 47a of the release actuation lever 47. A release detection lever spring 48c is wound around the lever bar 49 in such a way that the release detection lever 48 is always biased clockwise. The other end of the vertical hinge latch detection link 5D is connected to the tailgate release-latch unit 90, as shown in FIG. 2.

When the release actuation lever 47 is turned counter-clockwise as shown in FIG. 20 from the engaged condition of the vertical hinge latch mechanism 40 shown in FIG. 19, the latching pin 44d is pushed downwards, the action member 44c of the ratchet 44 moves away from the compartment, turning the ratchet clockwise. As a result, the latch 43 turns clockwise due to the bias of the latch spring, disengaging the vertical hinge latch mechanism 40. The tug on the vertical hinge latch actuation link 5C connected to the actuation movement member 47b causes the release actuation lever 47 to turn counter-clockwise. When the vertical hinge latch mechanism 40 assumes the disengaged condition, the latching pin 44d is pushed downward, which in turn pushes the detection action member 48a of the release detection lever 48 downward. This downward movement of the detection action member 48a tugs the vertical hinge latch detection link 5D towards the direction. When the vertical hinge latch mechanism 40 is in the disengaged condition, the action member 44c of the ratchet 44 stops at the position away from the compartment, causing the release detection lever 48 that is restrained by the latching pin 44d to stop at the position of disengaged condition shown in FIG. 20.

When the vertical hinge latch mechanism 40 goes from the disengaged condition shown in FIG. 20 to the engaged condition, the action member 44c of the ratchet 44 stops at the position towards the compartment, pushing the actuation action member 47a of the release actuation lever 47 upward and turning the release actuation lever 47 clockwise. The clockwise turning of the release actuation lever 47 frees the release detection lever 48 from the restraining latching pin 44d. The release detection lever 48 turns clockwise due to the bias force of the release detection lever spring 48c.

Figure 21:
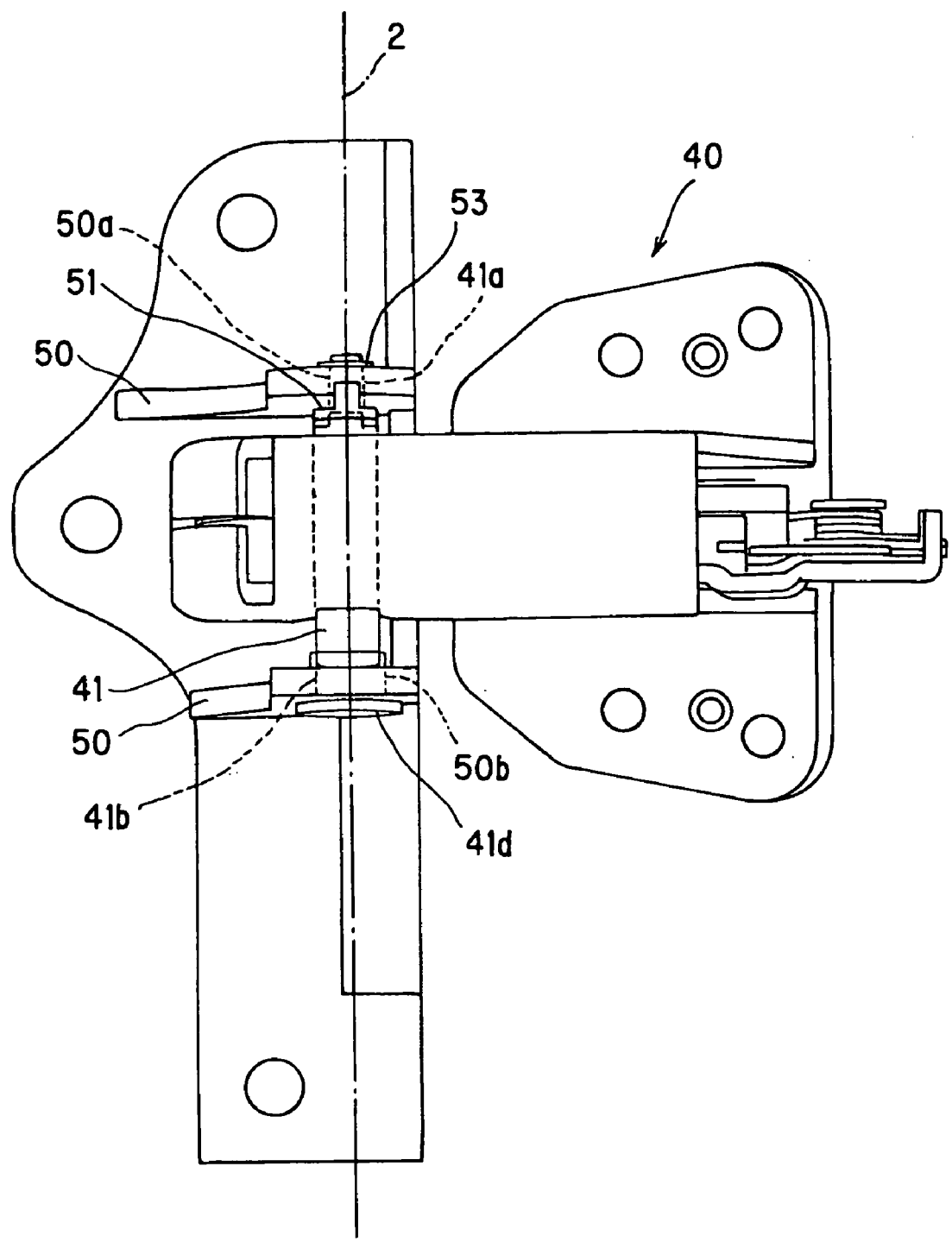
FIG. 21 is a drawing illustrating the structure of a vertical striker bar viewed from the rear of the vehicle.
Figure 22:
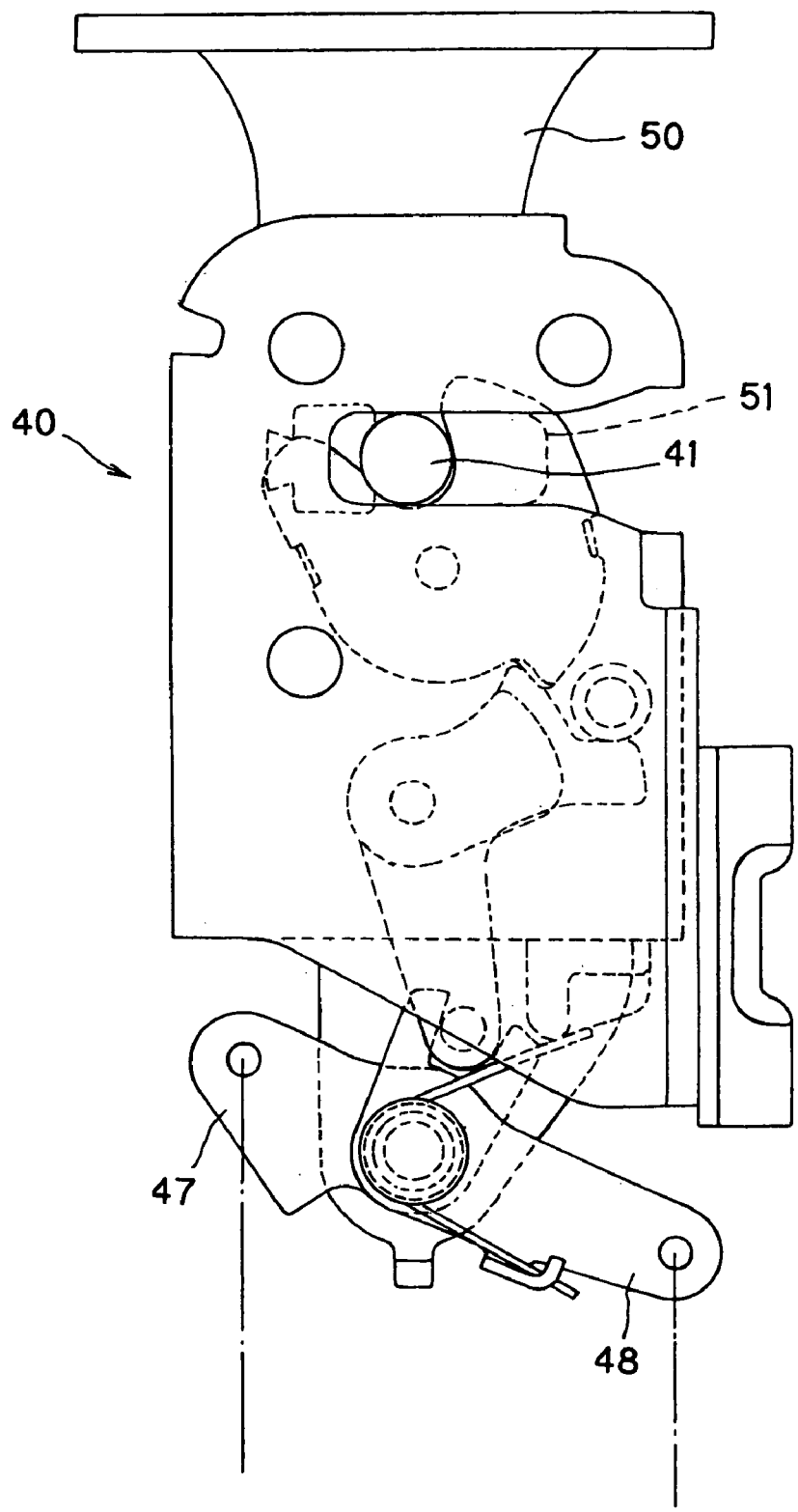
FIG. 22 is a drawing illustrating a top view of the vertical hinge latch mechanism turned about the vertical striker bar.

The structure of the vertical striker bar (engaging bar) 41 is explained next. FIG. 21 is a drawing illustrating the structure of the vertical striker bar viewed from the rear of the vehicle. FIG. 22 is a drawing illustrating a top view of the vertical hinge latch mechanism when it turns about the vertical striker bar.

As shown in FIG. 21, when viewed from the rear of the vehicle, the vertical striker bar 41 has a first end 41a and a second end 41b, which are supported between two facing plates of a striker supporting member 40. A portion of the first end 41a of the vertical striker bar 41 is narrowed and forms a not shown engagement member the cross section of which is like a circle flattened, similar to the horizontal striker bar 21. An engaging lever 51 engages with the engagement member. In other words, the engaging lever 51 is engaged non-rotatably against the vertical striker bar 41. The width of the engaging lever 51 matches the notch 42a of the housing 42 of the vertical hinge latch mechanism 40. The engaging lever 51 wraps halfway around the vertical striker bar 41.

As shown in FIG. 21, the first end 41a of the vertical striker bar 41 is narrower than the rest of the vertical striker bar 41 and engages with the engaging lever 51. The second end 41b of the vertical striker bar 41 has a uniform width matching with the width of the rest of the vertical striker bar 41. The first end 41a and the second end 42b of the vertical striker bar 41 are rotatably inserted in shaft slots 50a and 50b provided in the facing plates of the striker supporting member 50 with the aid of not shown pair of sliding shaft-bearing members. The sliding shaft-bearing members are made of a metal mesh impregnated with a resin material (a tetrafluoroethylene resin, for instance), the material enabling the vertical striker bar 41 to rotate with least friction in the shaft slots 50a and 50b of the striker supporting member 50. A retaining ring 53 is fitted at the first end 41a of the vertical striker bar 41 to prevent it from slipping from the shaft slot 50a of the striker supporting member 50. Similarly, a retaining flange 41d is provided at the second end 41b of the vertical striker bar 41 to prevent it from slipping from the shaft slot 50b of the striker supporting member 50.

The engaging lever 51 engages with the notch 42a, as shown in FIG. 19. When the engaging lever 51 is engaged with the notch 42a, the housing 42 is disposed between the facing plates of the striker supporting member 50. When the vertical hinge latch mechanism 40 in the engaged condition turns about the vertical striker bar 41, the engaging lever 51 engages with the notch 42a and turns as well. The turning of the engaging lever 51 causes the vertical striker bar 41 to turn as well. As a result, the vertical striker bar 41 rotates with least friction along with the vertical hinge latch mechanism 40 with the aid of the sliding shaft-bearing members.

Thus, the vertical hinge latch mechanism 40 in the engaged condition is rotatable clockwise (away from the compartment) about the vertical striker bar 41. As mentioned above, the vertical striker bar 41 is on the same axial line as the vertical axis 2. In other words, the vertical striker bar 41 which forms the axis of rotation of the vertical hinge latch mechanism 40 is on the same axial line as the vertical shaft 15 of the biaxial hinge 10. As a result, the vertical hinge latch mechanism 40 in the engaged condition and the vertical shaft 15 of the biaxial hinge 10 are able to support the swing-type release of the tailgate 1 with respect to the vehicle body 4.

Figure 23:
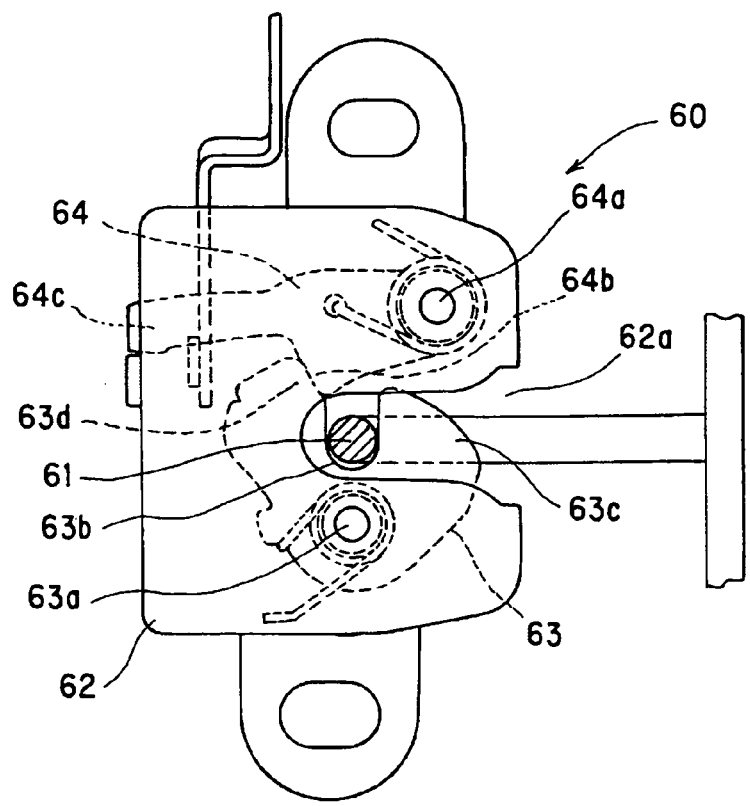
FIG. 23 is a drawing illustrating a right-hand side view of a common latch mechanism in an engaged condition.
Figure 24:
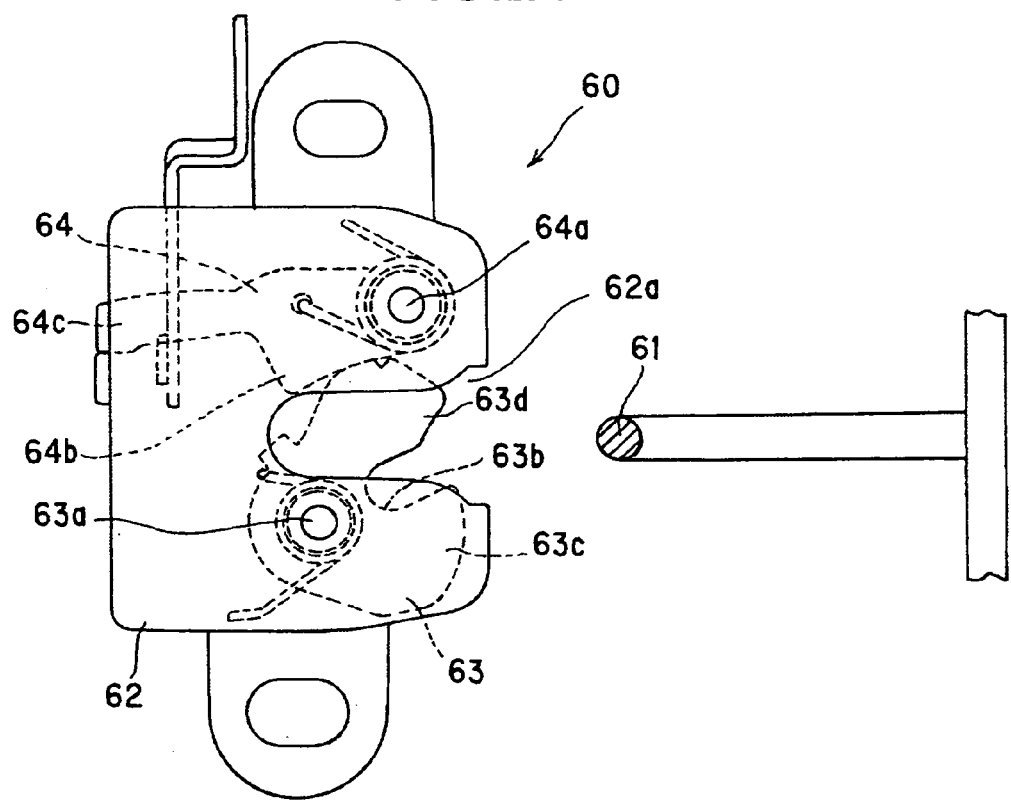
FIG. 24 is a right-hand side view of the common latch mechanism in a disengaged condition.
Figure 25:
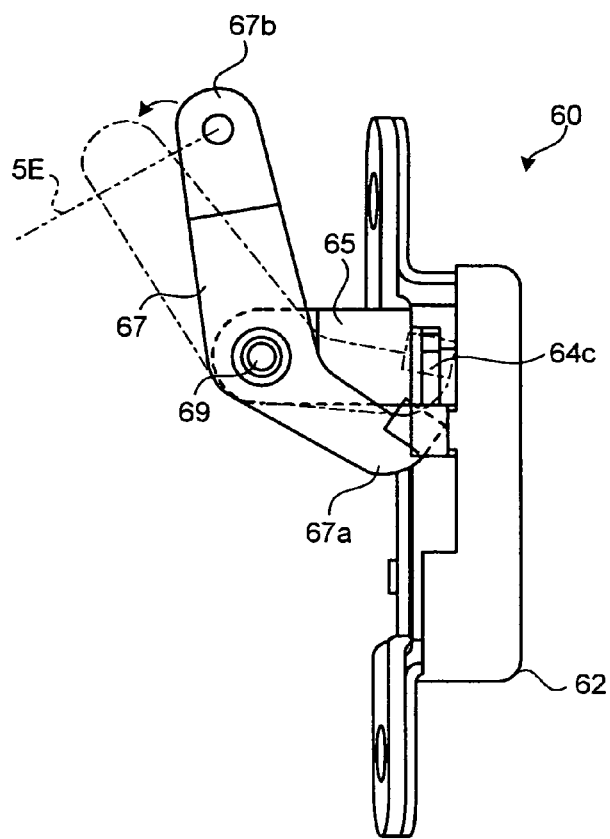
FIG. 25 is a drawing illustrating the common latch mechanism viewed from the rear of the vehicle.

The common latch mechanism 60 is explained next. FIG. 23 is a drawing illustrating a right-hand side view of the common latch mechanism in the engaged condition. FIG. 24 is a right-hand side view of the common latch mechanism in the disengaged condition. FIG. 25 is a drawing illustrating the common latch mechanism viewed from the rear of the vehicle.

The common latch mechanism 60 is provided on the upper right portion of the tailgate 1, as shown in FIG. 2. As shown in FIG. 23, the common latch mechanism 60 engages with/disengages from a rod-shaped striker 61 fixed on the vehicle body 4.

The common latch mechanism 60 has a housing 62 which is provided with a notch 62a extending substantially horizontally towards the compartment (that is, towards the front of the vehicle) of the vehicle body 4. The housing houses a latch 63 and a ratchet 64.

At a position below the notch 62a of the housing 62, a latch bar 63a, which extends parallel to the striker 61, rotatably supports the latch 63 with respect to the housing 62. The latch 63 includes an engagement groove 63b, a hooked portion 63c, and a latching member 63d. As shown in FIG. 23, the engagement groove 63b is an opening in the exterior surface of the latch 63 towards the latch bar 63a and is wide enough to accommodate the striker 61. When the open end of the engagement groove 63b faces upward, the hooked portion 63c is positioned more towards the compartment than the engagement groove 63b. When the open end of the engagement groove 63b faces upward, the latching member 63d is positioned more away from the compartment than the engagement groove 63b. A not shown latch spring is wound around the latch bar 63a in such a way that the latch 63 is always biased clockwise.

At a position above the notch 62a, a ratchet bar 64a, which extends parallel to the striker 61, rotatably supports the ratchet 64 with respect to the housing 62. The ratchet 64 includes an engagement member 64b and an action member 64c. As shown in FIG. 23, the engagement member 64b extends radially outwardly from the ratchet bar 64a towards the latch 63. The action member 64c extends to the right radially outwardly from the ratchet bar 64a. A not shown ratchet spring is wound around the ratchet bar 64a in such a way that the ratchet 64 is always biased counter-clockwise.

When the latch 63 is turned counter-clockwise, the hooked portion 63c of the latch 63 moves across the notch 62a, as shown in FIG. 23. The extended edge of the engagement member 64b of the ratchet 64 engages with the end surface of the latching member 63d and engages the latch 63 in that position. When the latch 63 and the ratchet 64 are in the position shown in FIG. 23, the striker 61 which moves in the notch 62a of the housing 62 is led towards the interior in the engagement groove 63b, and is prevented by the hooked portion 63c from moving in the direction that would disengage the striker 61 from the engagement groove 23b and the notch 22a. As a result, the region of the tailgate 1 on which the main latch mechanism 60 is provided remains engaged (engaged condition) against the vehicle body 4.

When the latch 63 is turned clockwise, as shown in FIG. 24, the hooked portion 63c of the latch 63 frees the notch 62a. The latching member 63d then moves across the notch 62a and assumes a position whereby the latching member 63d inclines upwards towards the interior (that is, away from the compartment) of the notch 62a. The clockwise turning of the latch 63 is caused by the bias force of the latch spring upon disengagement of the engagement member 63d of the latch 63 from the engagement member 64b by the clockwise turning of the ratchet 64. When the latch 63 and the ratchet 64 are in the positions shown in FIG. 24, the striker 61 can slide in and out of the notch 62a of the housing 62 and the engagement groove 63b of the latch 63. In other words, the striker 61 can now move in the direction in which it disengages from the engaged condition shown in FIG. 23. As a result, the region of the tailgate 1 on which the common latch mechanism 60 is provided disengages (disengaged condition) from the vehicle body 4. Upon entering the notch 62a in the disengaged condition shown in FIG. 24, the striker 61 comes in contact with the latching member 63d, causing the latch 63 to turn counter-clockwise, and moves interiorly in the engagement grooves 63b to assume the engaged condition shown in FIG. 23.

A portion of the exterior wall of the housing 62 is extended sideways to form a lever bracket 65. As shown in FIG. 25, a release actuation lever 67 is mounted on the lever bracket 65.

As shown in FIG. 24, the release actuation lever 67 is rotatably supported with respect to the lever bracket 65 with the aid of a lever bar 69, which is disposed perpendicular to the ratchet bar 64a. The release actuation lever 67 includes an actuation action member 67a and an actuation movement member 67*b*. The actuation action member 67*a* extends radially outwardly from the lever bar 69 towards the action member 64*c* of the ratchet 64, its extended edge coming in contact with the action member 64*c*. The actuation movement member 67*b* extends substantially upwardly and radially outwardly from the lever bar 69. One end of a common latch actuation link 5E, which may be a wire or a rod, is connected to the extended edge of the actuation movement member 67*b*. The other end of the common latch actuation link 5E is connected to the tailgate release-latch unit 90, as shown in FIG. 2.

When the release actuation lever 67 is turned clockwise as shown by the phantom lines in FIG. 25 from the engaged condition of the common latch mechanism 60 shown in FIG. 23, the action member 64*c* of the ratchet 64 moves upwards, turning the ratchet 64 clockwise. As a result, the latch 63 turns clockwise due to the bias force of the latch spring. The tug on the common latch actuation link 5E connected to the actuation movement member 67*b* causes the release actuation lever 67 to turn clockwise.

Figure 26:
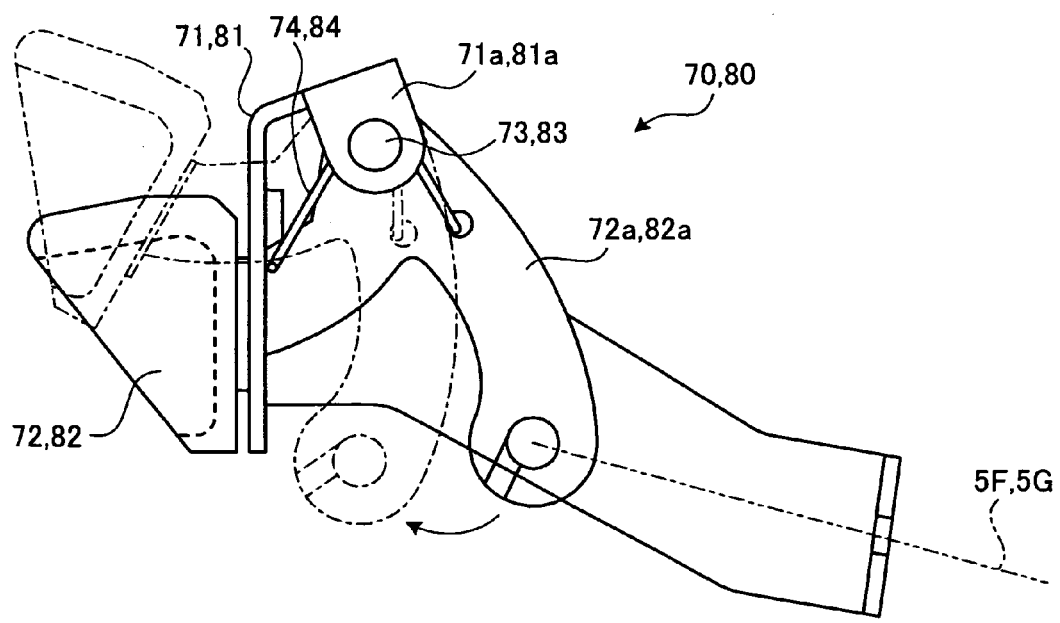
FIG. 26 is a drawing illustrating a right-hand side view of an actuation handle.

The swing actuation handle (the first actuation unit) 70 and the flap actuation (the second actuation unit) 80 are explained next. FIG. 26 is a drawing illustrating a right-hand side view of an actuation handle. The structures of the swing actuation handle 70 and the flap actuation handle 80 are identical. Therefore, the reference numerals of both the swing actuation handle 70 and the flap actuation handle 80 are jointly represented in FIG. 26.

The swing actuation handle 70 is provided on the right side of the tailgate 1, as shown in FIG. 2. As shown in FIG. 26, the swing actuation handle 70 comprises a handle 72 fitted to a fixed member 71 secured to the tailgate 1. The handle 72 is more away from the compartment than the fixed member 71 and juts out of the exterior wall of the tailgate 1. The handle 72 extends through the fixed member 71 towards the compartment as an arm 72*a*, which is integral with the handle 72. The arm 72*a* is pivotally supported about a support shaft 73 disposed laterally with respect to a support plate 71*a* of the fixed member 71. One end of a swing handle actuation link 5F is connected to the extended edge of the arm 72*a*. The other end of the swing handle actuation link 5F is connected to the tailgate release-latch unit 90, as shown in FIG. 2. A handle spring 74 is wound around the support shaft 73 in such as way the arm 72*a* is always biased counter-clockwise.

The user can manipulate the handle 72 of the swing actuation handle 70 by pivoting it away from the compartment, as indicated by the phantom lines in FIG. 26. This pivoting movement of the handle 72 is accompanied by a clockwise pivoting of the arm 72*a* against the bias force of the handle spring 74, shifting the extended edge of the arm 72*a* away from the compartment. As a result, the swing handle actuation link 5F gets tugged.

The flap actuation handle 80 is provided centrally on the upper part of the tailgate 1, as shown in FIG. 2. As shown in FIG. 26, the flap actuation handle 80 comprises a handle 82 fitted to a fixed member 81 secured to the tailgate 1. The handle 82 is more away from the compartment than the fixed member 81 and juts out of the exterior wall of the tailgate 1. The handle 82 extends through the fixed member 81 towards the compartment as an arm 82*a*, which is integral with the handle 82. The arm 82*a* is pivotally supported about a support shaft 83 disposed laterally with respect to a support plate 81*a* of the fixed member 81. One end of a flap handle actuation link 5G is connected to the extended edge of the arm 82*a*. The other end of the flap handle actuation link 5G is connected to the tailgate release-latch unit 90, as shown in FIG. 2. A handle spring 84 is wound around the support shaft 84 in such a way that the arm 82*a* is always biased counter-clockwise.

The user can manipulate the handle 82 of the swing actuation handle 80 by pivoting it away from the compartment, as indicated by the phantom lines in FIG. 26. This pivoting movement of the handle 82 is accompanied by a clockwise pivoting of the arm 82*a* against the bias force of the handle spring 84, shifting the extended edge of the arm away from the compartment. As a result, the flap handle actuation link 5G gets tugged.

Figure 27:
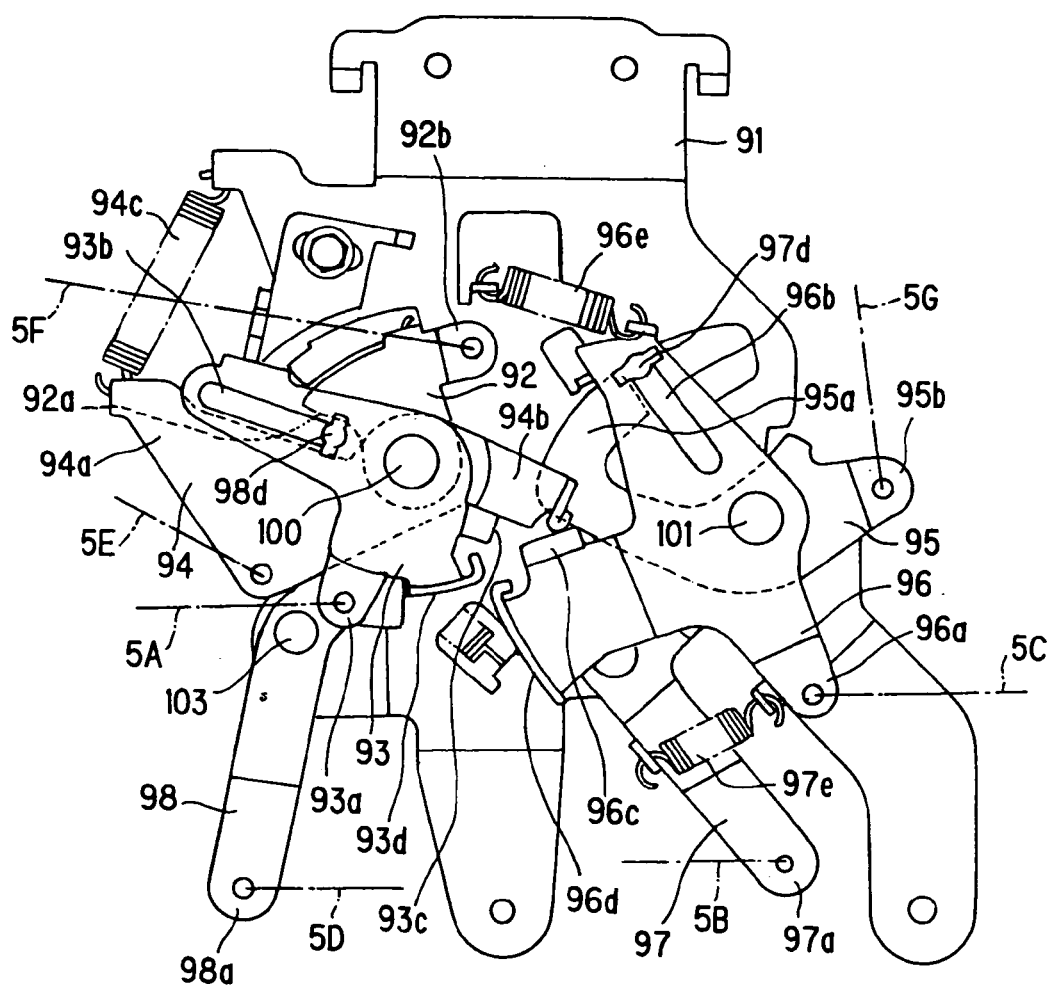
FIG. 27 is a drawing illustrating a tailgate release-latch unit viewed from the front of the vehicle.

The tailgate release-latch unit 90 is explained next. FIG. 27 is a drawing illustrating the tailgate release-latch unit viewed from the front of the vehicle. FIG. 28 is a drawing illustrating the tailgate release-latch unit viewed from the rear of the vehicle.

The tailgate release-latch unit 90 is provided at the center of the tailgate 1, as shown in FIG. 1. As shown in FIG. 27 and FIG. 28, the tailgate release-latch unit 90 includes a plate-like base 91 on which are mounted a swing handle lever 92, a horizontal hinge latch lever (a first transmission member) 93, a common latch lever 94, a flap handle lever 95, a vertical hinge latch lever (a second transmission member) 96, a horizontal hinge latch detection lever 97, and a vertical hinge latch detection lever 98.

As shown in FIG. 27, the swing handle lever 92 is rotatably supported with the aid of a swing handle lever bar 100 secured to the base 91 in the anteroposterior direction of the vehicle. The swing handle lever 92 includes a swing handle action member 92*a* and a swing handle movement member 92*b*. The swing handle action member 92*a* extends substantially upwards from a swing handle lever bar 100 in a fan-like form, and is an edge oriented counter-clockwise. The swing handle movement member 92*b* extends substantially upwards from the swing handle lever bar 100 in a fan-like form, and is an extension oriented clockwise. One end of the swing handle actuation link 5F is connected to the extended edge of the swing handle movement member 92*b*. The swing handle lever 92 includes a swing handle lever spring 92*c* (see FIG. 28), which connects the swing handle lever 92 with the base 91 and by which the swing handle lever 92 is always biased clockwise.

As shown in FIG. 27, the horizontal hinge latch lever 93 is rotatably supported in the forward direction of the vehicle with the aid of the swing handle lever bar 100 of the swing handle lever 92. The horizontal hinge latch lever 93 includes a horizontal hinge latch action member 93*a*, a horizontal hinge latch movement member 93*b*, a latching member 93*c*, and a contact member 93*d*. The horizontal hinge latch action member 93*a* extends substantially downwards from the swing handle lever bar 100. One end of the horizontal hinge latch actuation link 5A is connected to the extended edge of the horizontal hinge latch action member 93*a*. The horizontal hinge latch movement member 93*b* extends substantially to the left from the swing handle lever bar 100 and includes an elongated slot along the direction of extension. The latching member 93*c*, like the horizontal hinge latch action member 93*a*, extends substantially downwards from the swing handle lever bar 100. The extended end of the latch action member 93*a* forms an upright side disposed to the left from the horizontal hinge latch action member 93*a*, comprising an arched outer surface around the swing handle lever bar 100, and a rim along the edge in the counter-clockwise direction of the outer surface. The clockwise turning from the condition shown in FIG. 27 is controlled by the extended edge of the horizontal hinge latch lever 93 forming the horizontal hinge latch movement member 93*b* coming in contact with the base 91.

As shown in FIG. 27, the common latch lever 94 is rotatably supported with the aid of the swing handle lever bar 100 between the swing handle lever bar 92 and the horizontal hinge latch lever 93. The common latch lever 94 includes a common latch action member 94*a* and a common latch movement member 94*b*. The common latch action member 94*a* extends substantially to the left from the swing handle lever bar 100. One end of the common latch actuation link 5E is connected to the middle of the common latch action member 94*a*. The common latch movement member 94*b* extends substantially to the right from the swing handle lever bar 100, the extended edge forming an upright side. The edge of the common latch movement member 94*b* in clockwise direction is in contact with the latching member 93*c* of the horizontal hinge latch lever 93. The common latch lever 94 includes a common latch lever spring 94*c*, which connects the extended edge of the common latch lever 94 with the base 91 and by which the swing handle lever 94 is always biased clockwise.

As shown in FIG. 27, the flap handle lever 95 is rotatably supported with the aid of a flap handle lever bar 101 secured to the base 91 in the anteroposterior direction of the vehicle. The flap handle lever 95 includes a flap handle action member 95*a* and a flap handle movement member 95*b*. The flap handle action member 95*a* extends substantially to the left from the flap handle lever bar 101 and forms a rim in the clockwise direction. The flap handle movement member 95*b* extends substantially to the right from the flap handle lever bar 101. One end of the flap handle actuation link 5G is connected to the extended edge of the flap handle movement member 95*b*.

As shown in FIG. 27, the vertical hinge latch lever 96 is rotatably supported in the forward direction of the vehicle with the aid of the flap handle lever bar 101 of the flap handle lever 95. The vertical hinge latch lever 96 includes a vertical hinge latch action member 96*a*, a vertical hinge latch movement member 96*b*, a latching member 96*c*, and a contact member 96*d*. The vertical hinge latch action member 96*a* extends substantially downwards from the flap handle lever bar 101. One end of the vertical hinge latch actuation link 5C is connected to the extended edge of the vertical hinge latch action member 96*a*. The vertical hinge latch movement member 96*b* extends substantially upwards from the flap handle lever bar 101 and includes an elongated slot along the direction of extension. The latching member 96*c* extends substantially to the left from the flap handle lever bar 101. A part of the latching member 96*c* on the edge in the clockwise direction extends into a extended side. The latching member 96*c* is in contact with the upright side of the common latch movement member 94*b*. The contact member 96*d*, like the latching member 96*c*, extends substantially to the left from the flap handle lever bar 101. The extended end of the contact member 96*d* forms an upright side, comprising an arched outer surface around the flap handle lever bar 101, and a rim along the edge in the clockwise direction of the outer surface. The counter-clockwise turning from the condition shown in FIG. 27 is controlled by the extended edge of the vertical hinge latch lever 96 forming the vertical hinge latch movement member 96*b* coming in contact with the base 91.

As shown in FIG. 27 and FIG. 28, the horizontal hinge latch detection lever 97 is rotatably supported with the aid of a horizontal hinge latch detection lever bar 102 secured to the base 91 in the anteroposterior direction of the vehicle. The horizontal hinge latch detection lever 97 includes a horizontal hinge latch detection action member 97*a*, a horizontal hinge latch detection movement member 97*b*, and a link lever 97*c*. The horizontal hinge latch detection action member 97*a* extends substantially downward from the horizontal hinge latch detection lever bar 102. One end of the horizontal hinge latch detection link 5B is connected to the extended edge of the horizontal hinge latch detection action member 97*a*. The horizontal hinge latch detection movement member 97*b* extends substantially upwards from the horizontal hinge latch detection lever bar 102. One end of the link lever 97*c* is supported by the extended edge of the horizontal hinge latch detection movement member 97*b*. The other end of the link lever 97*c* bears a latching pin 97*d*, which latches into the elongated slot forming the vertical hinge latch movement member 96*b* of the vertical hinge latch lever 96. When the horizontal hinge latch mechanism 20 is the engaged condition, the flap handle action member 95*a* of the flap handle lever 95 is in contact with the latching pin 97*d*. The horizontal hinge latch detection lever 97 includes a horizontal hinge latch detection lever spring 94*e* which connects the horizontal hinge latch detection action member 97*a* with the base 91 and by which the horizontal hinge latch detection lever 97 is always biased counter-clockwise.

As shown in FIG. 27 and FIG. 28, the vertical hinge latch detection lever 98 is supported with the aid of a vertical hinge latch detection lever bar 103 secured to the base 91 in the anteroposterior direction of the vehicle. The vertical hinge latch detection lever 98 includes a vertical hinge latch detection action member 98*a*, a vertical hinge latch detection movement member 98*b*, and a link lever 98*c*. The vertical hinge latch detection action member 98*a* extends substantially downwards from the vertical hinge latch detection lever bar 103. One end of the vertical hinge latch detection link 5D is connected to the extended edge of the vertical hinge latch detection action member 98*a*. The vertical hinge latch detection movement member 98*b* extends substantially upwards from the vertical hinge latch detection lever bar 103. One end of the link lever 98*c* is supported by the extended edge of the vertical hinge latch detection movement member 98*b*. The other end of the link lever 98*c* bears a latching pin 98*d* which latches into the elongated slot forming the horizontal hinge latch movement member 93*b* of the horizontal hinge latch lever 93. When the vertical hinge latch mechanism 40 is the engaged condition, the swing handle action member 92*a* is in contact with the latching pin 98*d*. The vertical hinge latch detection lever 98 includes a vertical hinge latch detection lever spring 98*e* which connects the vertical hinge latch detection action member 98*a* with the base 91 and by which the vertical hinge latch detection lever 98 is always biased clockwise.

The actuation of the tailgate release-latch unit 90 is explained next with reference to FIG. 29 through FIG. 35. The tailgate release-latch unit 90 is actuated by the swing actuation handle 70 and the flap actuation handle 80. The actuation of the tailgate release-latch unit 90 is explained starting from the initial position of the tailgate 1 being substantially vertical covering the rear opening of the vehicle body 4, as shown in FIG. 1, wherein the horizontal hinge latch mechanism 20, the vertical hinge latch mechanism 40, and the common latch mechanism 60 are all in the engaged condition. In this initial position of the tailgate 1, the tailgate release-latch unit 90 is in the state shown in FIG. 27 and FIG. 28. This state of the tailgate release-latch unit 90 shall hereinafter be referred to as the initial state.

Upon actuation of the handle 72 of the swing actuation handle 70 when the tailgate release-latch unit 90 is in the initial state, the swing handle actuation link 5F gets tugged. The tug on the swing handle actuation link 5F is transmitted, via the swing handle movement member 92b to which one end of the swing handle actuation link 5F is connected, to the swing handle lever 92 causing the swing handle lever 92 to turn clockwise about the swing handle lever bar 100. As the swing handle lever 92 turns, the latching pin 98d of the swing handle action member 92a is pushed, causing the horizontal hinge latch lever 93 that is latched by the latching pin 98d to turn counter-clockwise. As the horizontal hinge latch lever 93 turns, the latching member 93c pushes the common latch movement member 94b of the common latch lever 94, causing the common latch lever 94 to turn counter-clockwise. The latching pin 98d moves when the common latch lever 94 turns. However, since one end of the link lever 98c is supported by the extended edge of the vertical hinge latch detection movement member 98b, the link lever 98c pivots about the point of support, preventing the transmission of the movement-causing force to the vertical hinge latch detection lever 98.

The turning of the horizontal hinge latch lever 93 causes a tug in the direction of the arrow on the horizontal hinge latch actuation link 5A, one end of which is connected to the horizontal hinge latch action member 93a of the horizontal hinge latch lever 93, and the turning of the common latch lever 94 causes a tug in the direction of the arrow on the common latch actuation link 5E, one end of which is connected to the common latch action member 94a of the common latch lever 94. As a result, the horizontal hinge latch mechanism 20 and the common latch mechanism 60 are mutually disengaged from one another, enabling the swing-type release of the tailgate 1, latched to the vehicle body 4 by means the vertical shaft 15 of the biaxial hinge 10 and the vertical striker bar 41 of the vertical hinge latch mechanism 40, about the vertical axis 2. In this way, the horizontal hinge latch lever (the first transmission member) 93 transmits the actuation of the swing actuation handle 70 to the horizontal hinge latch mechanism 20 and the common latch mechanism 60.

When the horizontal hinge latch mechanism 20 is in the disengaged condition, the release detection lever 28 stops at the position reached upon turning counter-clockwise (see FIG. 9). This causes a tug on the horizontal hinge latch detection link 5B in the direction of the arrow. The tug on the horizontal hinge latch detection link 5B is transmitted, via the horizontal hinge latch detection action member 97a to which one end of the horizontal hinge latch detection link 5B is connected, to the horizontal hinge latch detection lever 97 causing the horizontal hinge latch detection lever 97 to turn clockwise. As a result, the link lever 97c moves to maintain the position reached by the latching pin 97d along the elongated slot that forms the vertical hinge latch movement member 96b of the vertical hinge latch lever 96. Thus, the release detection lever 28 of the horizontal hinge latch mechanism 20, the horizontal hinge latch detection link 5B, and the horizontal hinge latch detection lever 97 form a first disengagement detection unit.

Figure 30:
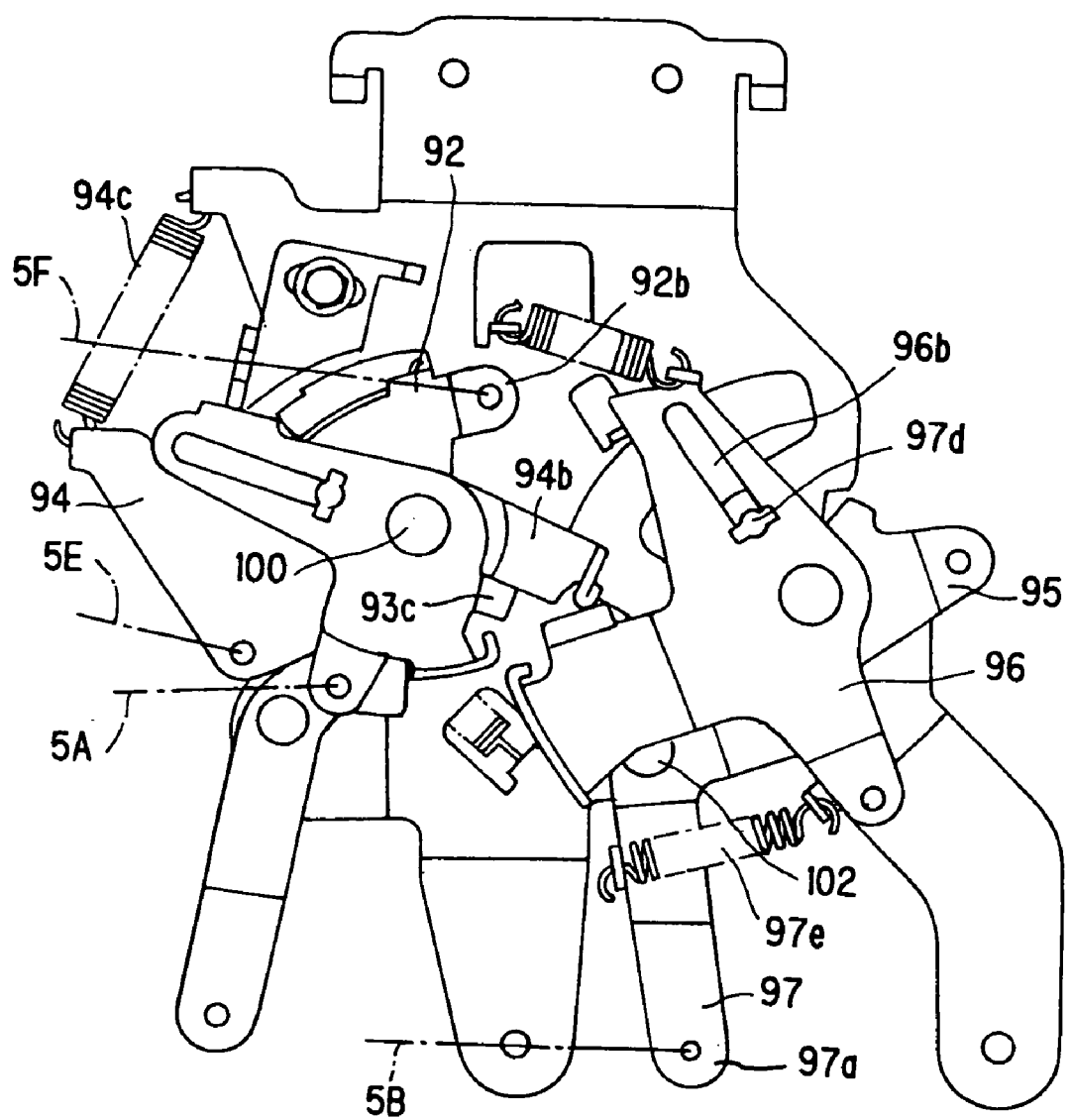
Figure 31:
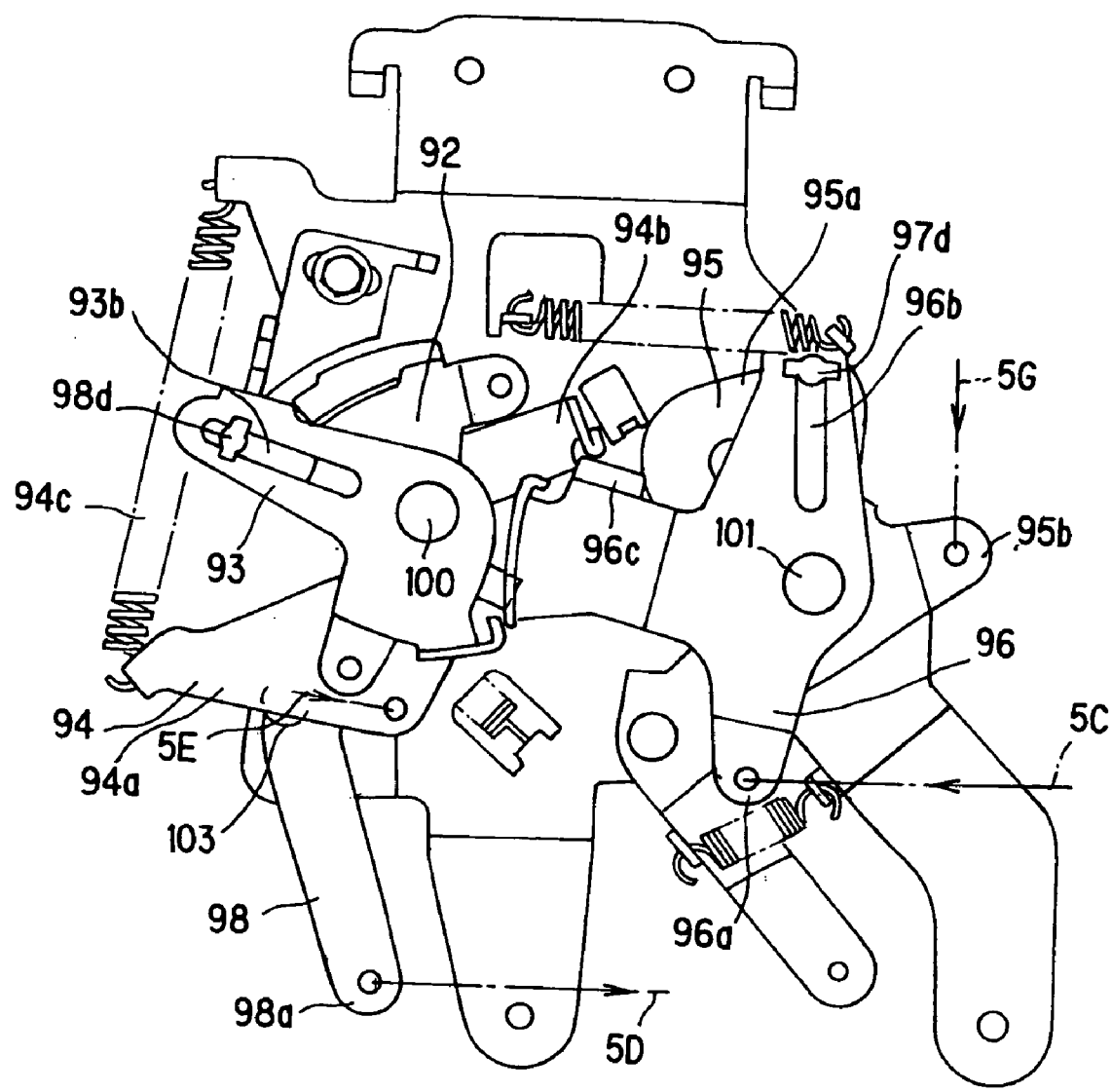

Once the tailgate 1 is released in swing mode, and the operator releases the grip on the handle 72 of the swing actuator handle 70, the common latch lever 94 turns clockwise due to the bias force of the common latch lever spring 94c, as shown in FIG. 30. This clockwise turning of the common latch lever 94 causes the horizontal hinge latch lever 93 to turn clockwise owing to the latching member 93c of the horizontal hinge latch lever 93 being in contact with the common latch movement member 94b of the common latch lever 94. This causes a bias force in the swing handle lever spring 92c resulting in the clockwise turning of the swing handle lever 92. As a result, leaving aside the horizontal hinge latch detection lever 97, all other parts return to the positions of the initial state.

Once the tailgate 1 is closed against the vehicle body 4 to return to the initial state from the released state shown in FIG. 30, the horizontal hinge latch mechanism 20 assumes the engaged condition, and the release detection lever 28 returns to the position reached upon turning clockwise (see FIG. 8). This relaxes the tug on the horizontal hinge latch detection link 5B, causing the horizontal hinge latch detection lever 97, connected to one end of the horizontal hinge latch detection link 5B with the aid of the horizontal hinge latch detection action member 97a, to turn counter-clockwise due to the bias force of the horizontal hinge latch detection lever spring 97e. As a result, the link lever 97c moves, and the latching pin 97d moves along the elongated slot forming the vertical hinge latch movement member 96b of the vertical hinge latch lever 96, returning the horizontal hinge latch detection lever 97 to the position of the initial state.

Upon actuation of the handle 82 of the flap actuation handle 80 when the tailgate release-latch unit 90 is in the initial state, the flap handle actuation link 5G gets tugged with the aid of a not shown link mechanism. The tug on the flap handle actuation link 5G is transmitted, via the flap handle movement member 95b to which one end of the flap handle actuation link 5G is connected, to the flap handle lever 95 causing the flap handle lever 95 to turn clockwise about the flap handle lever bar 101. As the flap handle lever 95 turns, the latching pin 97d of the flap handle action member 95a is pushed, causing the vertical hinge latch lever 96 that is latched by the latching pin 97d to turn clockwise. As the vertical hinge latch lever 96 turns, the latching member 96c pushes the common latch movement member 94b of the common latch lever 94, causing the common latch lever 94 to turn counter-clockwise. The latching pin 97d moves when the common latch lever 94 turns. However, since one end of the link lever 97c is supported by the extended edge of the horizontal hinge latch detection movement member 97b, the link lever 97c pivots about the point of support, preventing the transmission of the movement-causing force to the horizontal hinge latch detection lever 97.

The turning of the vertical hinge latch lever 96 causes a tug in the direction of the arrow on the vertical hinge latch actuation link 5C, one end of which is connected to the vertical hinge latch action member 96a of the vertical hinge latch lever 96, and the turning of the common latch lever 94 causes a tug in the direction of the arrow on the common latch actuation link 5C, one end of which is connected to the common latch action member 94a of the common latch lever 94. As a result, the vertical hinge latch mechanism 40 and the common latch mechanism 60 are mutually disengaged from one another, enabling the flap-type release of the tailgate 1, latched to the vehicle body 4 by means of the horizontal shaft 14 of the biaxial hinge 10 and the horizontal striker bar 41 of the horizontal hinge latch mechanism 20, about the horizontal axis 3. In this way, the vertical hinge latch lever (the second transmission member) 96 transmits the actuation of the flap actuation handle 80 to the vertical hinge latch mechanism 40 and the common latch mechanism 60.

When the vertical hinge latch mechanism 40 is in the disengaged condition, the release detection lever 48 stops at the position reached upon turning counter clockwise (see FIG. 20). This causes a tug on the vertical hinge latch detection link 5D in the direction of the arrow. The tug on the vertical hinge latch detection link 5D is transmitted, via the vertical hinge latch detection action member 98a to which one end of the vertical hinge latch detection link 5D is connected, to the vertical hinge latch detection lever 98 causing the vertical hinge latch detection lever 98 to turn counter-clockwise. As a result, the link lever 98c moves to maintain the position reached by the latching pin 98d along the elongated slot that forms the horizontal hinge latch movement member 93b of the horizontal hinge latch lever 93. Thus, the release detection lever 48 of the vertical hinge latch mechanism 40, the vertical hinge latch detection link 5D, and the vertical hinge latch detection lever 97 form a second disengagement detection unit.

Figure 32:
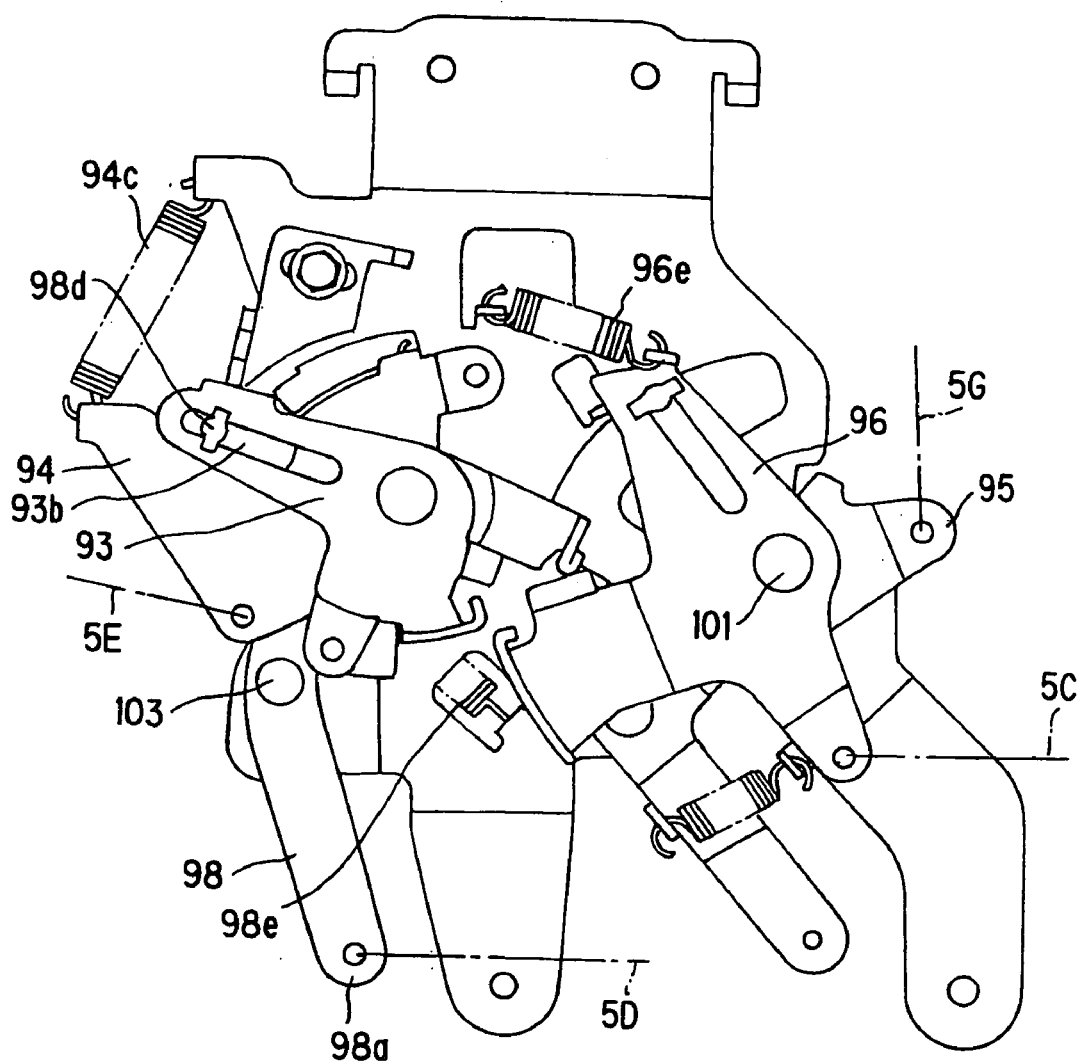

Once the flap-type release of the tailgate 1 is realized, and the operator releases the grip on the handle 82 of the flap actuator handle 80, the common latch lever 94 turns clockwise due to the bias force of the common latch lever spring 94c, as shown in FIG. 32. This clockwise turning of the common latch lever 94 causes the vertical hinge latch lever 96 to turn counter-clockwise due to the bias force of the vertical hinge lever spring 96e. This causes the flap handle lever 95, which is in contact with the latching pin 97 that is latched with the horizontal hinge latch lever 96, to turn counter-clockwise. As a result, leaving aside the vertical hinge latch detection lever 98, all other parts return to their positions of the initial state.

Once the tailgate is closed against the vehicle body 4 to return to the initial state from the released state shown in FIG. 32, the vertical hinge latch mechanism 40 assumes the engaged condition, and the release detection lever 48 returns to the position reached upon turning clockwise (see FIG. 19). This relaxes the tug on the vertical hinge latch detection link 5D, causing the vertical hinge latch detection lever 98, connected to one end of the vertical hinge latch detection link 5D with the aid of the vertical hinge latch detection action member 98a, to turn clockwise due to the bias force of the vertical hinge latch detection lever spring 98e. As a result, the link lever 97c moves, and the latching pin moves along the elongated slot forming the horizontal hinge latch movement member 93b of the horizontal hinge latch lever 93, returning the vertical hinge latch detection lever 98 to the position of the initial state.

Figure 33:
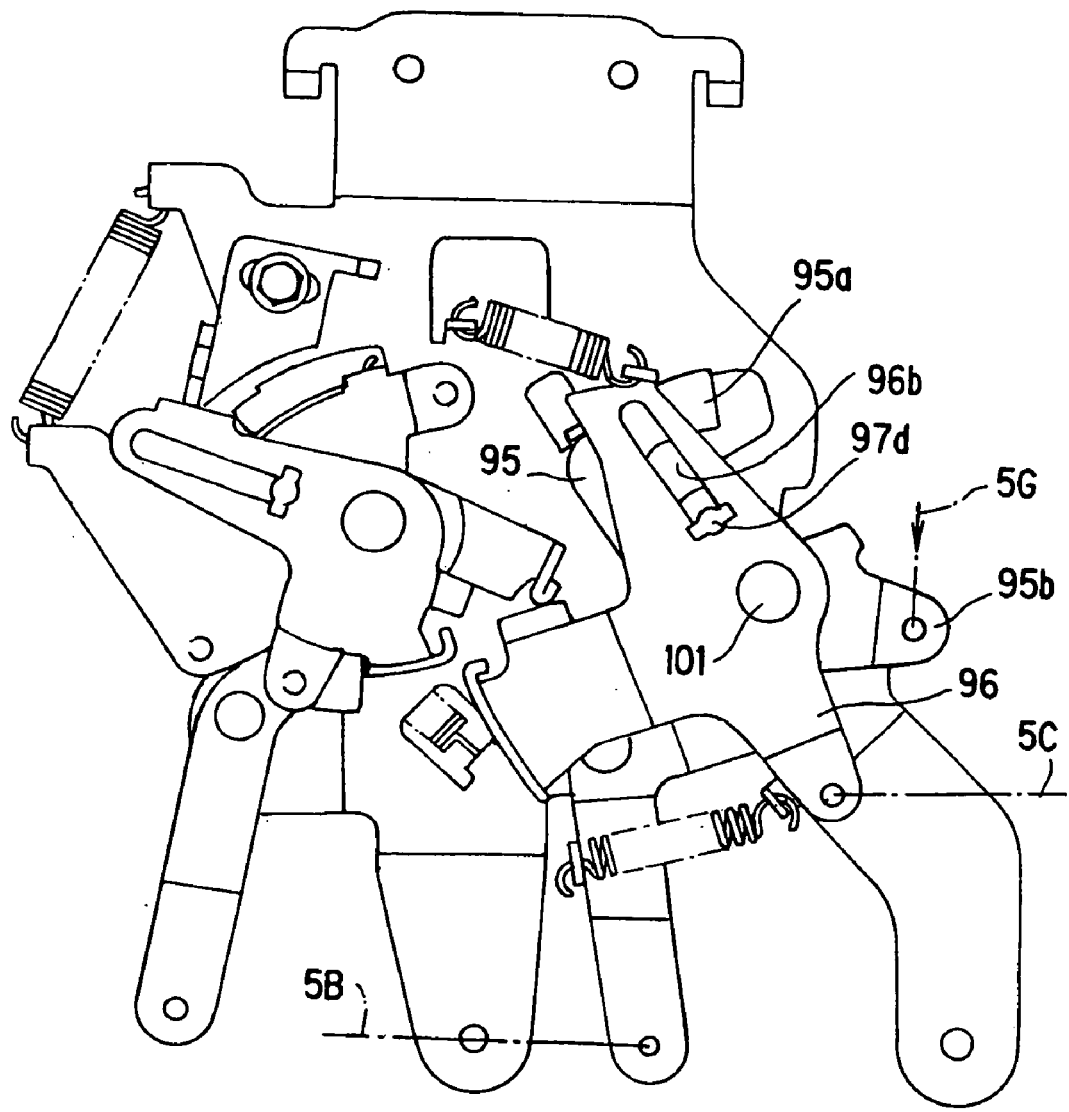

When the flap actuation handle 80 is actuated when the tailgate 1 is released in swing mode as shown in FIG. 30, the flap handle actuation link 5G is pushed, causing the flap handle lever 95 to turn clockwise, as shown in FIG. 33. When the tailgate 1 is released in the swing mode, the horizontal hinge latch mechanism 20 is in the disengaged condition. Therefore, the latching pin 97d of the horizontal hinge latch detection lever 97 maintains its position in the elongated slot forming the vertical hinge latch movement member 96b. Consequently, the flap handle action member 95a of the flap handle lever 95 that has turned clockwise "freewheels" without coming in contact with the latching pin 97d. Thus, the vertical hinge latch lever 96 does not turn, preventing the disengagement of vertical hinge latch mechanism 40. In other words, when the horizontal hinge latch mechanism 20 is found to be in the disengaged condition, the first disengagement detection unit causes the flap actuation handle 80 to "freewheel" by blocking the transmission of the actuation of the flap actuation handle 80 to the vertical hinge latch lever 96. Thus, the tailgate release-latch unit 90 disables the actuation of the flap actuation handle 80 when the horizontal hinge latch 20 of the tailgate 1 is in the disengaged condition with the tailgate 1 released in swing mode.

Figure 34:
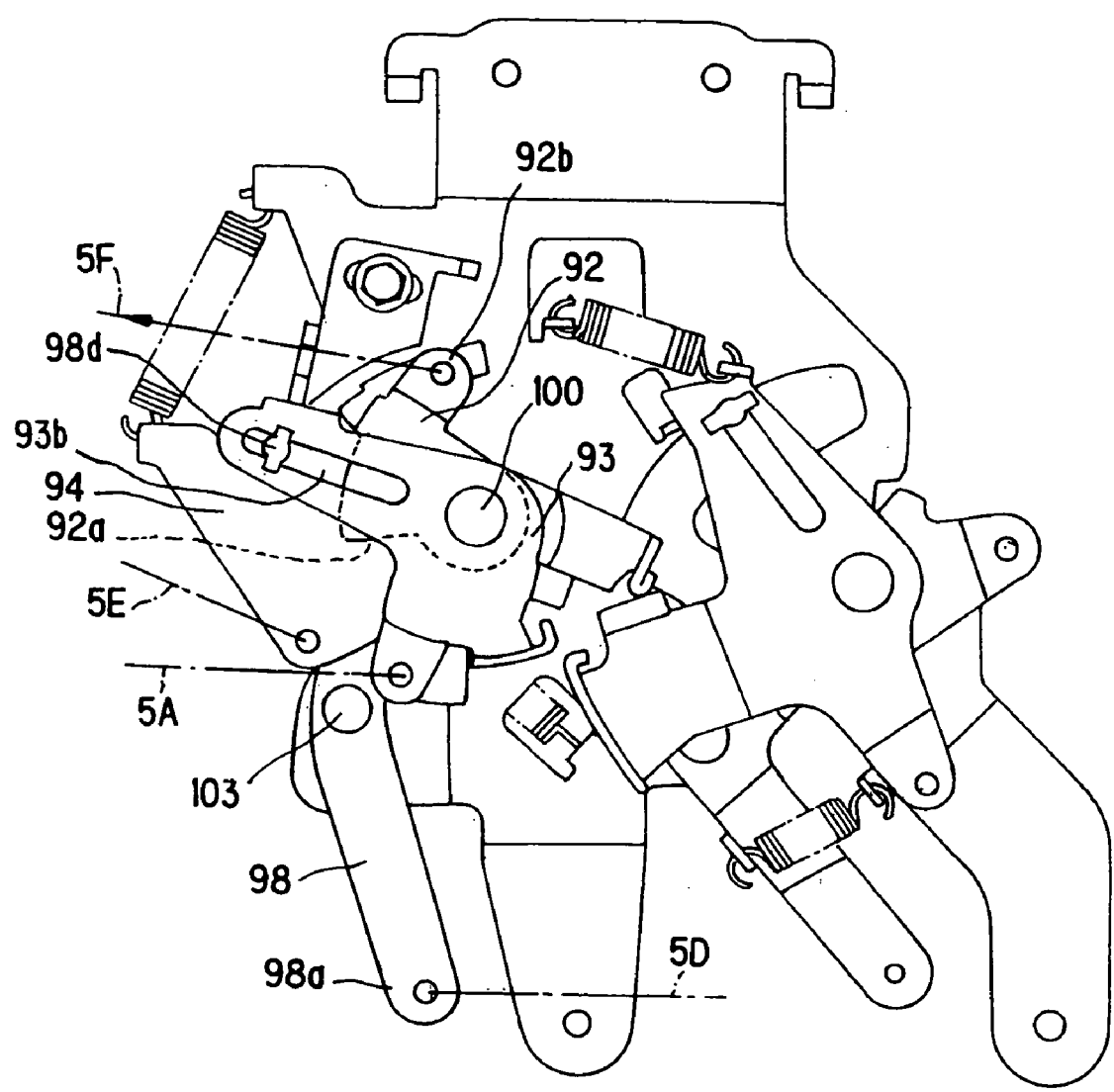
Figure 35:
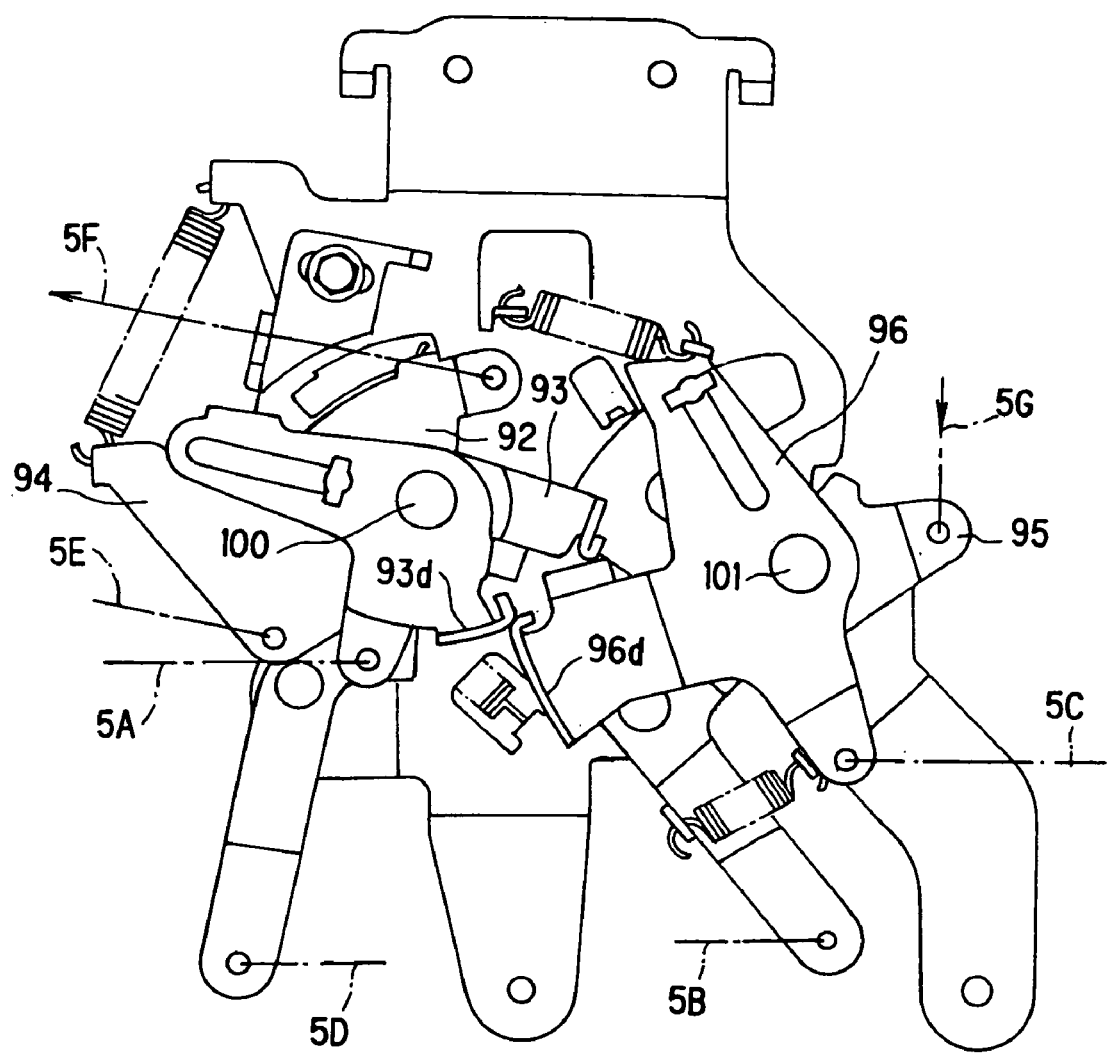

Similarly, when the swing actuation handle 70 is actuated when the tailgate 1 is released in flap mode as shown in FIG. 32, the swing handle actuation link 5F gets tugged, causing the swing handle lever 92 to turn counter-clockwise, as shown in FIG. 34. When the tailgate 1 is released in the flap mode, the vertical hinge latch mechanism 40 is in the disengaged condition. Therefore, the latching pin 98d of the vertical hinge latch detection lever 98 maintains its position in the elongated slot forming the horizontal hinge latch movement member 93b. Consequently, the swing handle action member 92a of the swing handle lever 92 that has turned counter-clockwise "freewheels" without coming in contact with the latching pin 98d. Thus, the horizontal hinge latch lever 93 does not turn, preventing the disengagement of horizontal hinge latch mechanism 20. In other words, when the vertical hinge latch mechanism 40 is found to be in the disengaged condition, the second disengagement detection unit causes the swing actuation handle 70 to "freewheel" by blocking the transmission of the actuation of the flap actuation handle 70 to the horizontal hinge latch lever 93. Thus, the tailgate release-latch unit 90 disables the actuation of the swing actuation handle 70 when the vertical hinge latch 40 of the tailgate 1 is in the disengaged condition with the tailgate 1 released in flap mode.

When the handle 72 of the swing actuation handle 70 and the handle 82 of the flap actuation handle 80 are simultaneously actuated when the tailgate release-latch unit 90 is in the initial state, the contact member 93d of the horizontal hinge latch lever 93 rotating counter-clockwise and the contact member 96d of the vertical hinge latch lever 96 rotating clockwise come in contact with each other, thereby disabling the actuation of both the actuation handles 70 and 80.

Upon actuation of the flap actuation handle 80 when the actuation of the swing actuation handle 70 is underway but before the horizontal hinge latch mechanism 20 assumes the disengaged condition, the tailgate release-latch unit 90 disables the actuation of the flap actuation handle 80 by stopping the turning of the vertical hinge latch lever 96 realized by the contact member 96d of the vertical hinge latch lever 96 turning clockwise coming in contact with the contact member 93d of the horizontal hinge latch lever 93 turning counter-clockwise.

Similarly, upon actuation of the swing actuation handle 70 when the actuation of the flap actuation handle 80 is underway but before the vertical hinge latch mechanism 40 assumes the disengaged condition, the tailgate release-latch unit 90 disables the actuation of the swing actuation handle 70 by stopping the turning of the vertical hinge latch lever 93 realized by the contact member 93d of the horizontal hinge latch lever 93 turning counter-clockwise coming in contact with the contact member 96d of the vertical hinge latch lever 96 turning clockwise, thereby disabling the actuation of the swing actuation handle 70.

Thus, in the biaxial hinge tailgate latch device, when the swing actuation handle 70 is actuated, the tailgate release-latch unit 90 disables the actuation of the flap actuation handle 80 upon detection of the disengaged condition of the horizontal hinge latch mechanism 20 by the first disengagement detection unit. Likewise, when the flap actuation handle 80 is actuated, the tailgate release-latch unit 90 disables the actuation of the swing actuation handle 70 upon detection of the disengaged condition of the vertical hinge latch mechanism 40 by the second disengagement detection unit. In other words, the common latch mechanism 60, which functions both in the swing mode and flap mode release of the tailgate 1, is not saddled with the components required for disabling the actuation of the actuation handles 70 and 80 but has only the components required for the detection of the disengaged condition of the hinge latch mechanisms 20 and 40. Once the disengaged condition is detected, the detection is conveyed to the tailgate release-latch unit 90, which then disables the actuation handles 70 and 80. Consequently, damage to the common latch mechanism can be prevented by keeping it light. The structures of the common latch mechanism 60, and the hinge latch mechanisms 20 and 40 thus can be simplified.

When the horizontal hinge latch mechanism 20 assumes the disengaged condition upon actuation of the swing actuation handle 70, the tailgate release-latch unit 90 disables the actuation of the flap actuation handle 80 by letting the flap handle lever 95 to "freewheel". Likewise, when the vertical hinge latch mechanism 40 assumes the disengaged condition upon actuation of the flap actuation handle 80, the tailgate release-latch unit 90 disables the actuation of the swing actuation handle 70 by letting the swing handle ever 92 to "freewheel". As the result, the components are prevented from colliding with each other, with the result that their durability is enhanced.

If both the swing actuation handle 70 and the flap actuation handle 80 are simultaneously actuated, the tailgate release-latch unit 90 disables the actuation of both the actuation handles 70 and 80. As a result, the release mode of the tailgate 1 is made determinable.

The tailgate release-latch unit 90 disables the actuation of the flap actuation handle 80 when actuation of swing actuation handle 70 is underway and before the horizontal hinge latch mechanism 20 assumes the disengaged condition. Likewise, the tailgate release-latch unit 90 disables the actuation of the swing actuation handle 70 when actuation of the flap actuation handle 80 is underway and before the vertical hinge latch mechanism 40 assumes the disengaged condition. As a result, the release mode of the tailgate 1 is made determinable.

Both the swing actuation handle 70 and the flap actuation handle 80 in the biaxial tailgate latch device described above are provided on the tailgate 1 externally, that is, outside the compartment. Therefore, compared with the case where one actuation handle is provided on the compartment side of the tailgate 1 and the other provided externally, the frequency of redundant actuation of the two actuation handles is far less. The swing actuation handle 70 and the flap actuation handle 80 need not necessarily be provided only externally and may both be provided on the compartment side of the tailgate 1.

In the embodiment described above, the first disengagement detection unit that detects the disengaged condition of the horizontal hinge latch mechanism 20 comprises mechanically connecting the release detection lever 28 and the horizontal hinge latch detection lever 97 with the aid of the horizontal hinge latch detection link 5E. As an alternative structure of the first disengagement detection unit, a not shown micro switch may be provided to detect the movement of the release detection lever 28, and according to the detection, the horizontal hinge latch detection lever 97 may be actuated with the aid of a solenoid, etc. Likewise, in the embodiment described above, the second disengagement detection unit that detects the disengaged condition of the vertical hinge latch mechanism 40 comprises mechanically connecting the release detection lever 48 and the vertical hinge latch detection lever 98 with the aid of the vertical hinge latch detection link 5D. As an alternative structure of the disengagement detection unit, a not shown micro switch may be provided to detect the movement of the release detection lever 48, and according to the detection, the horizontal hinge latch detection lever 98 may be actuated with the aid of a solenoid, etc. Similarly, the horizontal hinge latch actuation link 5A, the vertical hinge latch actuation link 5C, and the common latch actuation link 5E, which are mechanical structures in the embodiment described above, may be converted into a structure comprising a micro switch and a solenoid.

In the biaxial hinge tailgate latch device described above, the first end 21a and the second end 21b of the horizontal striker bar 21 engaging the horizontal hinge latch mechanism 20 are mounted on the striker supporting member 30 fixed on the vehicle body 4 with the aid of a pair of sliding shaft-bearing members 32. The horizontal striker bar 21 has an engaging lever 31 that engages with the horizontal hinge latch mechanism 20. Similarly, the first end 41a and the second end 41b of the vertical striker bar 41 engaging the vertical hinge latch mechanism 40 are mounted on the striker supporting member 50 fixed on the vehicle body 4 with the aid of a pair of sliding shaft-bearing members. The vertical striker bar 41 has an engaging lever 52 that engages with the vertical hinge latch mechanism 40.

In such a structure as described above, when the hinge latch mechanisms 20 and 40 rotate, the respective striker bars 21 and 41 and also rotate. Thus, damage to the hinge latch mechanisms 20 and 40 due to striker bars 21 and 41 pressing against them can be prevented. Particularly, in the case where the latches 23 and 43 that come in contact with the respective striker bars 21 and 41 are covered by the resin material, damage to the covering can be prevented. As a result, the durability of the components that turn the hinge latch mechanisms 20 and 40 for releasing the tailgate 1 in swing mode and flap mode can be enhanced.

The durability of the striker bars 21 and 41 can be further enhanced if the sliding shaft-bearing members 32 that support the striker bars 21 and 41 on the striker supporting members 30 and 50 are made of metal mesh impregnated with a resin material.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A biaxial hinge tailgate latch device comprising:
a biaxial hinge supporting rotatably about a first axis and a second axis, a tailgate against a fixed part;
a first hinge latch mechanism that supports the tailgate rotatably about the first axis between an engaged condition and a disengaged condition against the fixed part;
a second hinge latch mechanism that supports the tailgate rotatably about the second axis between the engaged condition and the disengaged condition against the fixed part, wherein the tailgate is pivoted about the second axis by setting the first hinge latch mechanism in the disengaged condition and about the first axis by setting the second hinge latch mechanism in the disengaged condition; and
a first engaging bar that is provided on the fixed part for engaging with the first hinge latch mechanism and a second engaging bar that is provided on the fixed part for engaging with the second hinge latch mechanism, wherein the first engaging bar and the second engaging bar are each rotatably supported against the fixed part with the aid of a pair of sliding shaft-bearing members.

2. The biaxial hinge tailgate latch device according to claim 1, wherein the sliding shaft-bearing members are made of metal mesh impregnated with a resin material.

3. The biaxial hinge tailgate latch device according to claim 1, further comprising an engaging lever that engages with the first hinge latch mechanism the second hinge latch mechanism when the first engaging bar and the second engaging bar respectively pivot along with the first hinge latch mechanism the second hinge latch mechanism when in the engaged condition.

4. The biaxial hinge tailgate latch device according to claim 2, further comprising an engaging lever that engages with the first hinge latch mechanism the second hinge latch mechanism when the first engaging bar and the second engaging bar respectively pivot along with the first hinge latch mechanism the second hinge latch mechanism when in the engaged condition.

* * * * *